United States Patent
Wakabayashi et al.

(10) Patent No.: US 10,016,699 B2
(45) Date of Patent: Jul. 10, 2018

(54) DISTILLATION COLUMN

(71) Applicant: TOYO ENGINEERING CORPORATION, Tokyo (JP)

(72) Inventors: Toshihiro Wakabayashi, Narashino (JP); Kouichi Tachikawa, Narashino (JP)

(73) Assignee: Toyo Engingeering Corporation, Tokyo (JP)

( * ) Notice: Subject to any disclaimer, the term of this patent is extended or adjusted under 35 U.S.C. 154(b) by 586 days.

(21) Appl. No.: 14/593,299

(22) Filed: Jan. 9, 2015

(65) Prior Publication Data

US 2015/0202547 A1    Jul. 23, 2015

(30) Foreign Application Priority Data

Jan. 17, 2014    (JP) ................................. 2014-006885

(51) Int. Cl.
| | |
|---|---|
| *B01D 3/14* | (2006.01) |
| *B01D 3/16* | (2006.01) |
| *B01D 3/00* | (2006.01) |
| *B01D 1/28* | (2006.01) |

(52) U.S. Cl.
CPC ........... *B01D 3/143* (2013.01); *B01D 1/2856* (2013.01); *B01D 3/007* (2013.01); *Y02B 30/52* (2013.01)

(58) Field of Classification Search
CPC ...... B01D 1/2856; B01D 3/007; B01D 3/143; Y02B 30/52
See application file for complete search history.

(56) References Cited

U.S. PATENT DOCUMENTS

| | | | | |
|---|---|---|---|---|
| 4,277,268 A | * | 7/1981 | Spangler, Jr. ........ | B01D 1/2856 203/24 |
| 4,626,321 A | | 12/1986 | Grethlein et al. | |
| 4,718,986 A | | 1/1988 | Comiotto et al. | |
| (Continued) | | | | |

FOREIGN PATENT DOCUMENTS

| | | |
|---|---|---|
| CN | 101792363 A | 8/2010 |
| CN | 102959051 A | 3/2013 |
| (Continued) | | |

OTHER PUBLICATIONS

Perry's Chemical Engineers' Handbook, 8th Ed., 2008, McGraw-Hill, pp. 13-4:13-5 & 13-58:13-67.*

(Continued)

*Primary Examiner* — Renee Robinson
*Assistant Examiner* — Derek N Mueller
(74) *Attorney, Agent, or Firm* — Knobbe, Martens, Olson & Bear, LLP

(57) ABSTRACT

Significant energy saving can be achieved for a distillation column even when the distillation column has a large column temperature difference. Provided is a distillation column including a first and second columns, wherein the first column includes a part of a rectifying section or a part of a stripping section; the second column includes, if the first column includes a part of the rectifying section, the rest of the rectifying section and the whole of the stripping section, or the second column includes, if the first column includes a part of the stripping section, the rest of the stripping section and the whole of the rectifying section; and the second column constitutes a mechanical-heat-pump distillation column.

8 Claims, 11 Drawing Sheets

(56) References Cited

U.S. PATENT DOCUMENTS

| | | |
|---|---|---|
| 5,435,436 A | 7/1995 | Manley et al. |
| 5,682,762 A | 11/1997 | Agrawal et al. |
| 5,783,047 A | 7/1998 | Aso et al. |
| 2010/0197987 A1 | 8/2010 | Almering |
| 2012/0002444 A1 | 1/2012 | Kim et al. |
| 2012/0085126 A1 | 4/2012 | Gupta et al. |
| 2012/0125761 A1 | 5/2012 | Nakaiwa et al. |
| 2013/0247611 A1 | 9/2013 | Zick |
| 2013/0256115 A1 | 10/2013 | Wakabayashi et al. |

FOREIGN PATENT DOCUMENTS

| | | |
|---|---|---|
| CN | 102985776 A | 3/2013 |
| DE | 102007004788 A1 | 8/2008 |
| EP | 0060357 A | 9/1982 |
| JP | S45-4726 B | 2/1970 |
| JP | S57-209602 A | 12/1982 |
| JP | S59-196833 A | 11/1984 |
| JP | H08-66601 A | 3/1996 |
| JP | 2004-16928 A | 1/2004 |
| JP | 2006-349319 A | 12/2006 |
| JP | 2013-208561 A | 10/2013 |
| WO | 2011/043199 A1 | 9/2010 |
| WO | 2012/012153 A2 | 1/2012 |

OTHER PUBLICATIONS

Extended European Search Report dated Jun. 10, 2015 in application No. 15150913.0.
Sulzer Chemtech Distillation and Heat-Pump Technology, Poduction of 1-Butene from Tail Gas of a MTBE Plant, Sulzer Chemtech Ltd.
Office Action dated Sep. 19, 2017 in corresponding application No. JP 2014-006885.
Office Action dated Sep. 27, 2017 in corresponding application No. CN 201510019653.9.
Taiwanese Office Action dated May 9, 2018 in Application No. 104101138 in 5 pages.

* cited by examiner

DISTILLATION COLUMN

This application is based upon and claims the benefit of priority from Japanese patent application No. 2014-006885, filed on Jan. 17, 2014, the disclosure of which is incorporated herein in its entirety by reference.

BACKGROUND OF THE INVENTION

1. Field of the Invention

The present invention relates to a distillation column used for carrying out a distillation operation widely employed in a large number of industrial processes, and more particularly, relates to a mechanical-heat-pump distillation column which is a distillation column that includes a mechanical heat pump system.

2. Description of the Related Art

A section located above a feed stage of a distillation column used for carrying out continuous distillation is referred to as a rectifying section, and a section below the feed stage is referred to as a stripping section. The distillation column is provided with an overhead condenser for cooling and condensing an overhead vapor, and a reboiler for heating and boiling a column bottom liquid.

A mechanical-heat-pump distillation column is known as a distillation column improved in view of saving energy. As the mechanical-heat-pump distillation column, a vapor re-compression system (VRC) is known as described in the pamphlet "Sulzer Chemtech Distillation and Heat-Pump Technology, Production of 1-Butene from Tail Gas of a MTBE Plant" from Sulzer Chemtech Ltd., and U.S. Pat. No. 4,718,986 A. Also, a heat integrated distillation column (HIDiC) is known as described in JP H08-66601 A, JP 2004-16928 A, WO 2011/043199, and JP 2013-208561 A.

In the VRC, an overhead vapor withdrawn from the column top is compressed by a compressor to be increased in temperature, and the temperature-increased fluid is used as a heat source of the reboiler of the VRC. It can be said that, in the VRC, heat of the column top of one column can be fed to the column bottom of the same column by using a mechanical heat pump system. Therefore, the amount of heat to be supplied at the reboiler can be reduced, and energy consumption in the distillation column can be reduced. The VRC is also referred to as a mechanical vapor recompression (MVR).

The HIDiC has a basic configuration in which the rectifying section and the stripping section of one distillation column are separated from each other. The operating pressure of the rectifying section is set to be higher than the operating pressure of the stripping section in order that the operating temperature of the rectifying section becomes higher than the operating temperature of the stripping section. To this end, a high-pressure column including the rectifying section and a low-pressure column including the stripping section are used. A vapor withdrawn from the column top of the low-pressure column is compressed by a compressor to be increased in temperature, and then transferred to the column bottom of the high-pressure column. Also, a liquid withdrawn from the column bottom of the high-pressure column is transferred to the column top of the low-pressure column. Further, the HIDiC is configured so that heat can be exchanged between the rectifying section and the stripping section. Accordingly, heat is transferred from the rectifying section to the stripping section (internal heat exchange), and therefore, it is possible to reduce the amount of heat to be supplied at the reboiler and to reduce the amount of heat to be removed at the overhead condenser.

In other words, by transferring heat from the rectifying section to the stripping section by the heat exchange, the heat to be supplied at the reboiler and the heat to be removed at the condenser can be at least partially substituted with the transferred heat, and as a result, a distillation apparatus that has extremely high energy efficiency can be obtained.

In the mechanical-heat-pump distillation column, a vapor withdrawn from any position of the distillation column is compressed by the compressor to be increased in temperature. This makes it possible to perform heat exchange for feeding heat of an overhead vapor to the reboiler, or to perform heat exchange for transferring heat from the rectifying section (the high-pressure column) to the stripping section (the low-pressure column).

SUMMARY OF THE INVENTION

In the mechanical-heat-pump distillation column, a pressurizing operation using a compressor is performed in order to increase the temperature of a vapor. Therefore, it is necessary to make the increase of the temperature larger, that is, to increase the compression ratio of the compressor, when the distillation column has a larger column temperature difference. Consequently, the larger the column temperature difference is, the more the compressor consumes power, and therefore, the smaller the energy saving is.

Thus, for a distillation column that has a large column temperature difference, it is difficult to save energy by applying the mechanical-heat-pump distillation column, or the energy saving is small.

An object of the present invention is to achieve significant energy saving for a distillation column even when the distillation column has a large column temperature difference.

According to some aspects of the present invention, the following distillation columns are provided.

1) A distillation column including a first column and a second column, wherein
the first column includes a part of a rectifying section or a part of a stripping section;
the second column includes, if the first column includes a part of the rectifying section, the rest of the rectifying section and the whole of the stripping section, or the second column includes, if the first column includes a part of the stripping section, the rest of the stripping section and the whole of the rectifying section, and
the second column constitutes a mechanical-heat-pump distillation column.

2) The distillation column according to 1), wherein the number of stages of the first column is 40% or less of the total number of stages of the distillation column.

3) The distillation column according to 1) or 2), wherein the second column constitutes a heat integrated distillation column or a vapor re-compression system.

4) The distillation column according to 3), wherein the second column includes:
a higher-pressure part including the whole or a part of the rectifying section included in the second column and configured to perform gas-liquid contact at a relatively high pressure;
a lower-pressure part including the whole or a part of the stripping section included in the second column and configured to perform gas-liquid contact at a relatively low pressure;

a vapor line that is a line for directing a vapor discharged from a column top of the lower-pressure part to a column bottom of the higher-pressure part, the vapor line including a pressurizing means;

a liquid line that is a line for directing a liquid discharged from the column bottom of the higher-pressure part to the column top of the lower-pressure part; and a heat exchange structure configured to transfer heat from the rectifying section included in the second column to the stripping section included in the second column by heat exchange.

5) The distillation column according to 3), wherein the second column includes:

a reboiler; and a line for supplying a vapor discharged from a column top of the second column to the reboiler as a heat source of the reboiler, this line including a pressurizing means.

According to the present invention, it is possible to achieve significant energy saving for a distillation column even when the distillation column has a large column temperature difference.

DETAILED DESCRIPTION OF THE EXEMPLARY EMBODIMENTS

Figure 1:
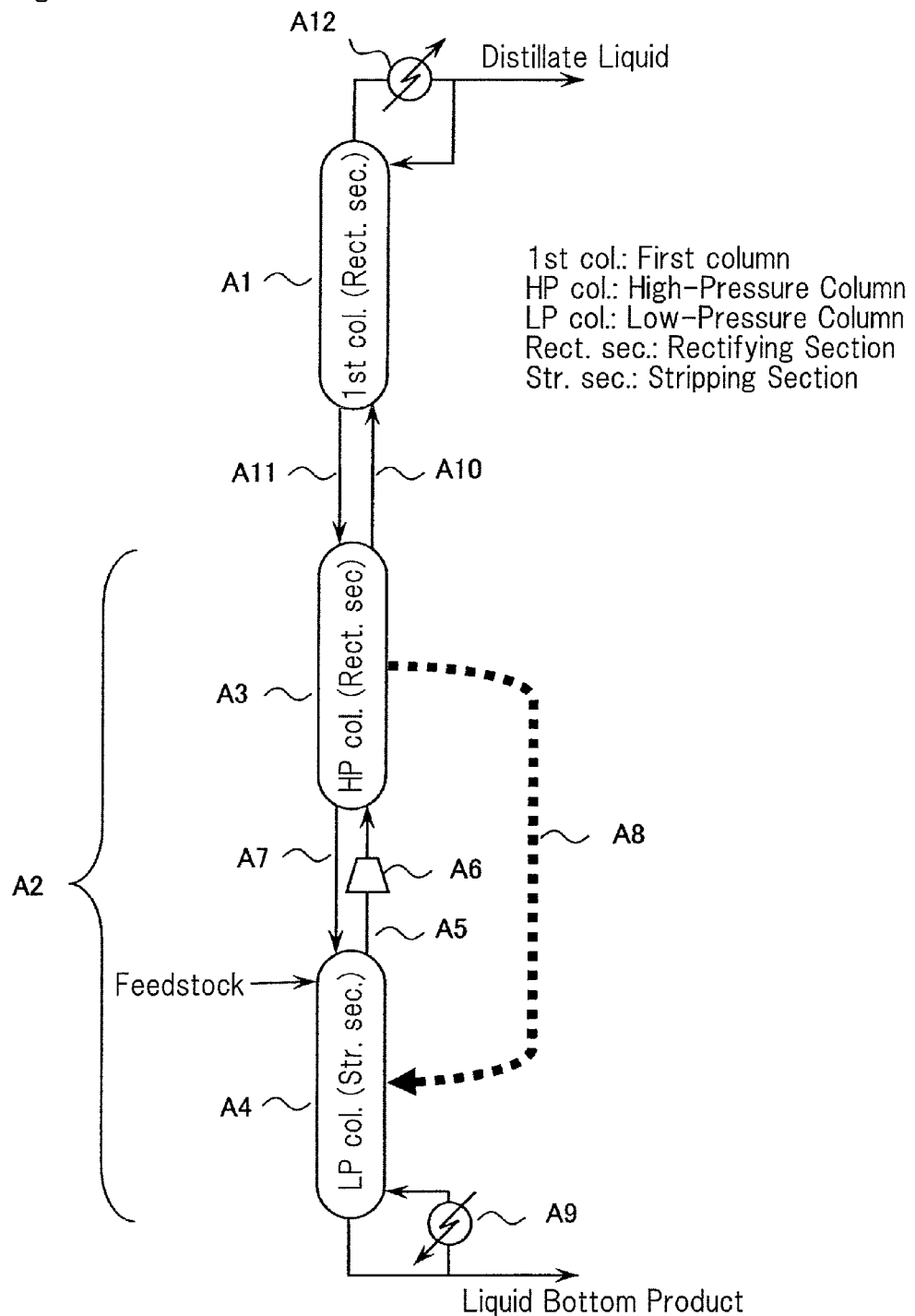
FIG. 1 is a schematic view illustrating an embodiment of a distillation column of the present invention.

In the following, embodiments of the present invention will be described with reference to the drawings, but the present invention is not limited thereto.

A distillation column of the present invention includes a first column and a second column. The first column may include a part of a rectifying section of the distillation column, and in this case, the second column includes the rest of the rectifying section of the distillation column and the whole of a stripping section of the distillation column. Alternatively, the first column may include a part of the stripping section of the distillation column, and in this case, the second column includes the rest of the stripping section of the distillation column and the whole of the rectifying section of the distillation column. The first column includes a part of the rectifying section of the distillation column or a part of the stripping section of the distillation column, and thus, does not include both of the rectifying section and the stripping section of the distillation column. Also, the first column does not include the whole of the rectifying section of the distillation column, and does not include the whole of the stripping section of the distillation column.

The distillation column of the present invention has a configuration that is obtained by dividing one conventional distillation column (more precisely, continuous distillation column) into two columns, namely, a first column and a second column, at a position partway along the rectifying section or the stripping section. A feedstock is supplied to an intermediate stage (a stage other than the column top and the column bottom) of the second column. The conventional distillation column has a single column (vessel), and the whole of the rectifying section and the whole of the stripping section exist in a continuous region inside the single vessel. The conventional distillation column is not equipped with a compressor. In other words, the distillation column of the present invention has a configuration that is obtained by partitioning the interior region of one conventional distillation column into two regions, accommodating these two regions in separate columns (vessels) respectively, and connecting the two columns via lines for transferring fluids between the two columns (a line for transferring vapor and a line for transferring liquid). The whole amount of each fluid discharged from one of these columns is supplied to the other of these columns except for the amount of a part of the discharged fluid that is first discharged from the former column and then returned to the same former column. That is, when a vapor is transferred from one of these columns to the other of these columns, the whole amount of the vapor discharged from the former column is supplied to the latter column except for the amount of a part of the discharged vapor that is discharged from the former column and then returned to the same former column, for example, as a reflux. Also, when a liquid is transferred from one of these columns to the other of these columns, the whole amount of the liquid discharged from the former column is supplied to the latter column except for the amount of a part of the discharged liquid that is discharged from the former column and then returned to the same former column, for example, via a reboiler. In other words, when a fluid is exchanged between the first column and the second column, the fluid is not sent to any other apparatus than these columns or to the outside of the distillation column.

As for the first column, a configuration having a single column (vessel), but not having a plurality of columns (vessels) can be employed. Usually, a device for enhancing gas-liquid contact, such as a tray and a packed layer, is appropriately contained in the first column. The first column is not equipped with a pressurizing means, such as a compressor, for pressurizing a vapor discharged from the inside of the column. That is, the first column can have the same configuration as that of the conventional distillation column (however, the first column does not include the whole of the rectifying section, and does not include the whole of the stripping section of the distillation column as described above).

The second column constitutes a mechanical-heat-pump distillation column such as a heat integrated distillation column (HIDiC) and a vapor re-compression system (VRC). Usually, a device for enhancing gas-liquid contact, such as a tray and a packed layer, is appropriately contained also in the second column.

According to the present invention, it is possible to employ a two column configuration by dividing one conventional distillation column into a region having a relatively large column temperature difference and a region having a relatively small column temperature difference, applying the first column to the region having a relatively large column temperature difference, and applying the second column to the region having a relatively small column temperature difference. A mechanical-heat-pump distillation process is performed in the second column, but is not performed in the first column. That is, the mechanical-heat-pump distillation process can be applied only to the region with a relatively small column temperature difference within one distillation column. Therefore, it is possible to lower an increase in compressor power required for performing the mechanical-heat-pump distillation process. And hence, energy saving can be easily achieved even for a distillation column that has a large column temperature difference.

The position of dividing one conventional distillation column into the first column and the second column can be determined depending on the temperature profile of the conventional distillation column. For example, the dividing position can be determined such that the number of stages of the first column is roughly 40% or less of the total number of stages of the conventional distillation column. Detailed discussion in this regard will be made later referring to FIG. 5. The total number of stages of the distillation column of the present invention (the total of the number of stages of the first column and the number of stages of the second column) may be equal to or more than the total number of stages of the conventional distillation column. Therefore, setting the number of stages of the first column to be roughly 40% or less of the total number of stages of the conventional distillation column may correspond to setting the number of stages of the first column to be roughly 40% or less of the total number of stages of the distillation column of the present invention.

The distillation column of the present invention can be applied to any distillation column. It is particularly advantageous to use the distillation column of the present invention in place of a conventional distillation column in which a temperature change inside the column occurs intensively in some stages around the top or bottom of the column, for example, a conventional distillation column in which about 50% or more of the temperature change inside the column occurs in stages in the vicinity of the top or bottom of the column, where the number of these stages is roughly 40% or less of the total number of stages of the distillation column.

The distillation column of the present invention can be used as, for example, a distillation column for separating toluene from crude para-xylene to obtain purified para-xylene in an aromatics complex which includes an aromatic extraction apparatus for separating benzene from a feedstock, such as reformate or pyrolysis gasoline, and a para-xylene production apparatus for separating para-xylene from the same feedstock.

[Case where the HIDiC is Applied to the Second Column]

In the following, a case where the HOC is applied to the second column is described.

In this case, the second column may include:

a higher-pressure part including the whole or a part of a rectifying section included in the second column and configured to perform gas-liquid contact at a relatively high pressure;

a lower-pressure part including the whole or a part of a stripping section included in the second column and configured to perform gas-liquid contact at a relatively low pressure;

a vapor line that is a line, equipped with a pressurizing means, for directing a vapor discharged from a column top of the lower-pressure part to a column bottom of the higher-pressure part;

a liquid line that is a line for directing a liquid discharged from the column bottom of the higher-pressure part to the column top of the lower-pressure part; and a heat exchange structure configured to transfer heat from the rectifying section included in the second column to the stripping section included in the second column by heat exchange.

The Higher-Pressure Part and the Lower-Pressure Part

The terms "rectifying section" and the "stripping section" regarding a distillation operation have been used for a long period of time with respect to a distillation apparatus, particularly a continuous distillation apparatus. The rectifying section corresponds to a section located above a feedstock feed position in a conventional distillation column, which is composed of a single column. The stripping section corresponds to a section located below the feedstock feed position in the conventional distillation column. In other words, the rectifying section is a section for increasing the concentration of a light fraction as an object to be separated, contained in a feedstock. The stripping section is a section for increasing the concentration of a heavy fraction.

When the HIDiC is applied to the second column, the operating pressure of the higher-pressure part is set to be higher than the operating pressure of the lower-pressure part in order to make the operating temperature of the higher-pressure part higher than the operating temperature of the lower-pressure part. Here, a "relatively high or low pressure" is based on comparison between the pressures of the lower-pressure part and the higher-pressure part with each other.

The higher-pressure part basically corresponds to the rectifying section included in the second column and the lower-pressure part basically corresponds to the stripping section included in the second column. Accordingly, in the most basic configuration of the second column, the higher-pressure part includes the rectifying section included in the second column but does not include the stripping section included in the second column, and the lower-pressure part includes the stripping section included in the second column but does not include the rectifying section included in the second column. In other words, the higher-pressure part includes the whole of the rectifying section included in the second column and the lower-pressure part includes the whole of the stripping section included in the second column. However, the configuration of the second column is not limited to such a configuration. The lower-pressure part may include the whole of the stripping section included in the second column and also a part of the rectifying section included in the second column, while the rest of the rectifying section included in the second column may be included in the higher-pressure part. Alternatively, the higher-pressure part may include the whole of the rectifying section included in the second column and also a part of the stripping section included in the second column, while the rest of the stripping section included in the second column may be included in the lower-pressure part.

In other words, the basic configuration of the second column constituting the HIDiC is a configuration that is obtained by partitioning the second column, using a feedstock feed position as a boundary, into two regions (a higher-pressure part including the whole of the rectifying section included in the second column, and a lower-pressure part including the whole of the stripping section included in the second column). The configuration of the second column is not, however, limited to this configuration. It is also possible to employ a configuration that is obtained by partitioning the second column into two regions at a position above the feedstock feed position, namely, a configuration in which the second column is partitioned (a position located partway along the rectifying section included in the second column is used as a boundary) into two regions. In this case, one of these two regions corresponds to a lower-pressure part including the whole of the stripping section and a part of the rectifying section, and the other corresponds to a higher-pressure part not including the stripping section but including the rest of the rectifying section. Alternatively, it is possible to employ a configuration that is obtained by partitioning the second column into two regions at a position below the feedstock feed position, namely, a configuration in which the second column is partitioned (a position located partway along the stripping section included in the second column is used as a boundary) into two regions. In this case, one of these two regions corresponds to a higher-pressure part including the whole of the rectifying section included in the second column and a part of the stripping section included in the second column, and the other corresponds to a lower-pressure part not including the rectifying section included in the second column but including the rest of the stripping section included in the second column.

Naturally, if one of the higher-pressure part and the lower-pressure part includes both the rectifying section and the stripping section, the other never includes both of the rectifying section and the stripping section.

Each of the higher-pressure part and the lower-pressure part is typically formed by using a single column (vessel). A high-pressure column forming the higher-pressure part and a low-pressure column forming the lower-pressure part may be provided so as to be spaced from each other. Alternatively, the high-pressure column and the low-pressure column may be integrated with each other to form a single structure. For example, it is possible to divide the inside of a single vessel by a partition wall (a member through which fluid cannot pass) for forming two compartments, and to use one of the compartments as the high-pressure column and the other as the low-pressure column.

The Vapor Line

In a conventional distillation column, vapor ascends from a lower section (the stripping section) of the column to an upper section (the rectifying section). In the second column constituting the HIDiC, since the stripping section and the rectifying section are basically separated (partitioned), this line is provided for enabling such a stream of the vapor.

This line is provided with pressurizing means, such as a compressor, for transferring a vapor from the lower-pressure part (having a relatively low pressure) to the higher-pressure part (having a relatively high pressure).

The Liquid Line

In a conventional distillation column, liquid descends from an upper section (the rectifying section) of the column to a lower section (the stripping section). In the second column constituting the HIDiC, since the stripping section and the rectifying section are basically separated (partitioned), this line is provided for enabling such a stream of the liquid. This stream is sometimes referred to as an "intermediate reflux", and this line is sometimes referred to as an "intermediate reflux line".

Heat Exchange Structure

The second column includes a heat exchange structure configured to transfer heat from the rectifying section included in the second column to the stripping section included in the second column by heat exchange. Note that, in the present description, the term "heat exchange" more precisely means indirect heat exchange, unless otherwise noted.

The heat exchange structure can be formed by using a heat exchanger and piping and the like. For example, the heat exchange structure can include one or both of the configurations described in the following a) and b):

a) a heat exchanger provided in the rectifying section included in the second column (typically, the rectifying section included in the higher-pressure part), and a line for withdrawing a liquid from the stripping section included in the second column (typically, the stripping section included in the lower-pressure part), passing the liquid through this heat exchanger, and returning the resulting fluid to this stripping section; and b) a heat exchanger provided in the stripping section included in the second column (typically, the stripping section included in the lower-pressure part), and a line for withdrawing a vapor from the rectifying section included in the second column (typically, the rectifying section included in the higher-pressure part), passing the vapor through this heat exchanger, and returning the resulting fluid to this rectifying section.

Alternatively, it is possible to employ a structure in which a heat exchanger is provided outside the higher-pressure part and outside the lower-pressure part (typically, outside the high-pressure column and outside the low-pressure column), a liquid is withdrawn from the stripping section included in the second column (typically, the stripping section included in the lower-pressure part) and returned via this heat exchanger to this stripping section, and a vapor is withdrawn from the rectifying section included in the second column (typically, the rectifying section included in the higher-pressure part) and returned via this heat exchanger to this rectifying section, thereby performing heat exchange between these fluids.

The heat exchange structure may be any structure as long as heat can be transferred ultimately from the rectifying section included in the second column to the stripping section included in the second column. This heat exchange structure can be realized without directly using any of a fluid present within the rectifying section included in the second column and a fluid present within the stripping section included in the second column. For example, a fluid discharged from the rectifying section included in the second column and having a relatively high pressure (high temperature) can be used in place of a fluid present within the rectifying section included in the second column. Besides, a fluid which is to be fed into the stripping section included in the second column and having a relatively low pressure (low temperature) can be used in place of a fluid present within the stripping section included in the second column. For example, by exchanging heat between a feedstock which is to be fed into the stripping section included in the second column (typically, the stripping section included in the lower-pressure part) and a vapor withdrawn from the top of the rectifying section included in the second column (typically, the rectifying section included in the higher-pressure part), heat can be transferred from the rectifying section included in the second column to the stripping section included in the second column.

Only a single heat exchange structure may be employed, or a plurality of the heat exchange structures may be employed.

Here, discussion will be made on a configuration of the second column in which the lower-pressure part includes the whole of the stripping section included in the second column and a part of the rectifying section included in the second column and the higher-pressure part includes a part of the rectifying section included in the second column. This configuration includes, for example, an embodiment in which the low-pressure column includes, above the stripping section included in the second column, a part of the rectifying section included in the second column, and the high-pressure column includes the rest of the rectifying section included in the second column. In such a configuration, a fluid discharged from the column top of the low-pressure column (a fluid discharged from the rectifying section included in the low-pressure column) can be transferred to the column bottom of the high-pressure column via a compressor, and in this case, heat of the compressor outlet fluid can be given to a fluid present within the stripping section of the low-pressure column by heat exchange. For example, a heat exchange structure may be provided within the stripping section of the low-pressure column (for example, at a stage directly above the column bottom of the low-pressure column), and the fluid discharged from the column top of the low-pressure column can be supplied to the column bottom of the high-pressure column via the compressor and this heat exchange structure. By such heat exchange, heat can be transferred from the rectifying section included in the low-pressure column to the stripping section included in the low-pressure column. An example of this configuration is proposed in Japanese Patent Application No. 2012-080525 (JP 2013-208561 A).

In these embodiments of the heat exchange, heat exchange is performed between a process fluid of the second column and another process fluid of the second column. However, it is also possible to employ an embodiment in which heat exchange is performed via a fluid other than these fluids (for example, via a heating medium different from any of the process fluids of the second column).

The whole contents of Japanese Patent Application No. 2012-080525 and International Application PCT/JP2010/066498 (WO 2011/043199) filed by the same applicant as the present application are incorporated herein by reference.

[Case where the VRC is Applied to the Second Column]

In the following, a case where the VRC is applied to the second column is described.

In this case, the second column may include:

a reboiler; and a line, equipped with a pressurizing means, for supplying a vapor discharged from a column top of the second column to the reboiler as a heat source of the reboiler.

After the vapor discharged from the column top of the second column is used for heating a column bottom liquid of the VRC in the reboiler, the resulting fluid may be depressurized and decreased in temperature, and returned to the column top of the VRC as a reflux.

Embodiment A (HIDiC)

FIG. 1 schematically shows the configuration of one embodiment (Embodiment A) of the distillation column of the present invention. This distillation column includes first column A1 and second column A2. The second column constitutes the HIDiC, and includes high-pressure column A3 as the higher-pressure part, and low-pressure column A4 as the lower-pressure part. A feedstock is supplied to the column top of the low-pressure column. Therefore, a part of the rectifying section of the distillation column shown in FIG. 1 is included in the first column, and the rest is included in the high-pressure column. Also, the whole of the stripping section of the distillation column shown in FIG. 1 is included in the low-pressure column.

The operating pressure of the high-pressure column is higher than the operating pressure of the low-pressure column. To this end, pressurizing means A6, such as a compressor, is provided in vapor line A5. A vapor discharged from the column top of the low-pressure column is pressurized by the pressurizing means, and then supplied to the column bottom of the high-pressure column. A liquid discharged from the column bottom of the high-pressure column is supplied to the column top of the low-pressure column via liquid line A7. The liquid discharged from the column bottom of the high-pressure column may be reduced in pressure by a pressure reducing means, such as a pressure reducing valve, and then supplied to the column top of the low-pressure column, as necessary. A pump for transferring liquid can be used, as necessary, in such a case where the liquid cannot be transferred to the low-pressure column from the high-pressure column only by the difference in operating pressure between the high-pressure column and the low-pressure column due to a pressure loss in the piping or an elevation difference. The reason why the operating pressure of the high-pressure column is made higher than the operating pressure of the low-pressure column is to make the operating temperature of the high-pressure column (particularly, the rectifying section included in the high-pressure column) higher than the operating temperature of the low-pressure column (particularly, the stripping section included in the low-pressure column).

Heat exchange structure A8 for transferring heat from the rectifying section included in the high-pressure column to the stripping section included in the low-pressure column is provided. In FIG. 1, the detailed structure of the heat exchange structure is not shown, while heat transfer is conceptually shown by a dashed arrow (the same applies to FIGS. 2 to 4).

A part of a liquid discharged from the column bottom of the low-pressure column is heated in reboiler A9, at least partially vaporized, and returned to the low-pressure column. The rest of the liquid discharged from the column bottom of the low-pressure column is discharged from the distillation column as a liquid bottom product.

A vapor discharged from the column top of the high-pressure column is supplied to the column bottom of first column A1 via line A10. A liquid discharged from the column bottom of the first column is supplied to the column top of the high-pressure column via line A11. The operating pressure of the first column is equal to or lower than the operating pressure of the high-pressure column. The vapor discharged from the column top of the high-pressure column may be depressurized by a pressure reducing means, such as a pressure reducing valve, as necessary, and then supplied to the column bottom of the first column. A pump for transferring liquid may be used, as necessary, in such a case where the liquid discharged from the column bottom of the first column cannot be transferred to the high-pressure column from the first column due to a pressure loss in the piping or an elevation difference or the difference in operating pressure between the first column and the high-pressure column.

A condenser and a reflux line may not be provided (FIG. 1), or may be provided at the column top of the high-pressure column. Also, a reboiler may not be provided (FIG. 1), or may be provided at the column bottom of the first column. In any case, the whole amount of the vapor discharged from the column top of the high-pressure column (namely, the column top of the second column) is supplied to the column bottom of the first column except for the amount of a part of the discharged vapor that is optionally returned to the high-pressure column (as a reflux). Also, the whole amount of the liquid discharged from the column bottom of the first column is supplied to the column top of the high-pressure column (namely, the column top of the second column) except for the amount of a part of the discharged liquid that is optionally returned to the first column (after being reboiled).

A vapor discharged from the column top of the first column is cooled in overhead condenser A12, and at least partially condensed. A part of the condensed liquid is refluxed to the first column, and the rest of the condensed liquid (which may be accompanied by a vapor not condensed) is discharged from the distillation column as a distillate liquid.

For each of the configuration around overhead condenser A12 and the configuration around reboiler A9, a configuration applied to a conventionally-known distillation column can be employed. For example, a reflux drum (not shown) may be provided downstream of the overhead condenser, as necessary.

The fluid present within the rectifying section of the high-pressure column is cooled and the fluid present within the stripping section of the low-pressure column is heated by heat exchange structure A8. In other words, this heat exchange structure functions as a side cooler provided in the rectifying section of the distillation column shown in FIG. 1, and also functions as a side reboiler provided in the stripping section. According to the above-described configuration, heat can be transferred from the rectifying section included in the second column to the stripping section included in the second column.

Heat duties on overhead condenser A12 and reboiler A9 of the distillation column shown in FIG. 1 are reduced by the heat exchange structure as described above. On the other hand, required power of the compressor is additionally necessary as a load. However, if the required power can be kept sufficiently small, the energy consumption in the distillation column can be reduced.

The distillation column of Embodiment A can be preferably used in place of a conventional distillation column in which almost all column temperature change occurs in a region near the column top. This is because, by applying the HIDiC only to a region having a small column temperature change in the conventional distillation column, effective heat utilization can be achieved while the required power of the compressor is kept small.

Embodiment B (HIDiC)

Figure 2:
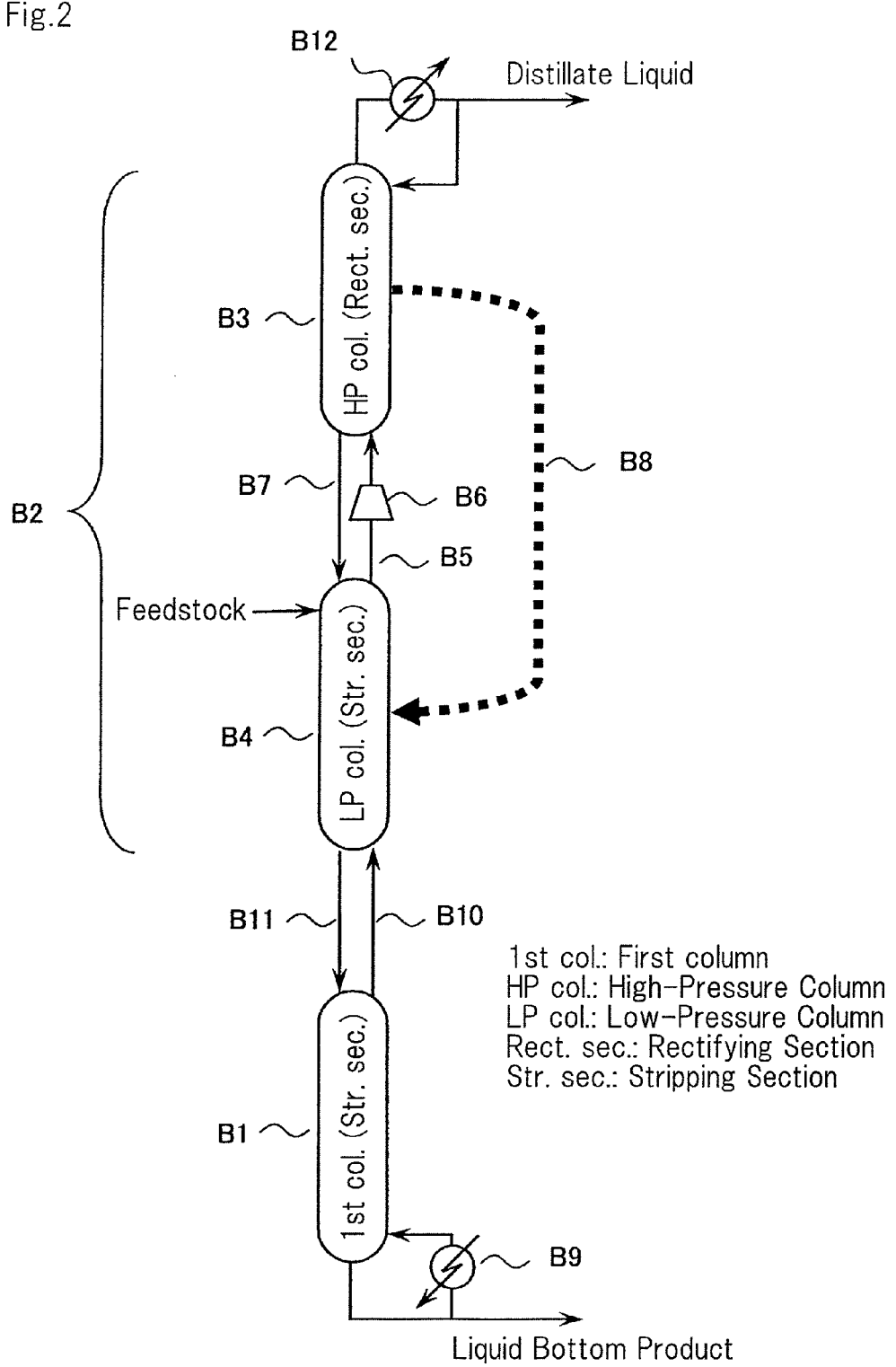
FIG. 2 is a schematic view illustrating another embodiment of the distillation column of the present invention.

FIG. 2 schematically shows the configuration of another embodiment (Embodiment B) of the distillation column of the present invention. This distillation column includes first column B1 and second column B2. The second column constitutes the HIDiC, and includes high-pressure column B3 as the higher-pressure part, and low-pressure column B4 as the lower-pressure part. A feedstock is supplied to the column top of the low-pressure column. Therefore, the whole of the rectifying section of the distillation column shown in FIG. 2 is included in the high-pressure column. Also, a part of the stripping section of the distillation column shown in FIG. 2 is included in the low-pressure column, and the rest is included in the first column.

The operating pressure of the high-pressure column is higher than the operating pressure of the low-pressure column. To this end, pressurizing means B6, such as a compressor, is provided in vapor line B5. A vapor discharged from the column top of the low-pressure column is pressurized by the pressurizing means, and then supplied to the column bottom of the high-pressure column. A liquid discharged from the column bottom of the high-pressure column is supplied to the column top of the low-pressure column via liquid line B7. The liquid discharged from the column bottom of the high-pressure column may be depressurized by a pressure reducing means, such as a pressure reducing valve, as necessary, and then supplied to the column top of the low-pressure column. A pump for transferring liquid can be used, as necessary, in such a case where the liquid cannot be transferred to the low-pressure column from the high-pressure column only by the difference in operating pressure between the high-pressure column and the low-pressure column due to a pressure loss in the piping or an elevation difference. The reason why the operating pressure of the high-pressure column is made higher than the operating pressure of the low-pressure column is to make the operating temperature of the high-pressure column (particularly, the rectifying section included in the high-pressure column) higher than the operating temperature of the low-pressure column (particularly, the stripping section included in the low-pressure column).

Heat exchange structure B8 for transferring heat from the rectifying section included in the high-pressure column to the stripping section included in the low-pressure column is provided.

A vapor discharged from the column top of the high-pressure column is cooled in overhead condenser B12, and at least partially condensed. A part of the condensed liquid is refluxed to the high-pressure column, and the rest of the condensed liquid (which may be accompanied by a vapor not condensed) is discharged from the distillation column as a distillate liquid.

A liquid discharged from the column bottom of the low-pressure column is supplied to the column top of the first column via line B11. A vapor discharged from the column top of the first column is supplied to the column bottom of the low-pressure column via line B10. The operating pressure of the first column is set to be slightly higher than the operating pressure of the low-pressure column. This pressure difference allows the vapor discharged from the column top of the first column to be supplied to the column bottom of the low-pressure column against a pressure loss in the piping or the like. With regard to the liquid discharged from the column bottom of the low-pressure column, a pump for transferring the liquid may be used, as necessary, in such a case where the liquid cannot be transferred to the first column from the low-pressure column due to a pressure loss in the piping or an elevation difference or the difference in operating pressure between the first column and the low-pressure column.

A condenser and a reflux line may not be provided (FIG. 2), or may be provided at the column top of the first column. Also, a reboiler may not be provided (FIG. 2), or may be provided at the column bottom of the low-pressure column. In any case, the whole amount of the vapor discharged from the column top of the first column is supplied to the column bottom of the low-pressure column (namely, the column bottom of the second column) except for the amount of a part of the discharged vapor that is optionally returned to the first column (as a reflux). Also, the whole amount of the liquid discharged from the column bottom of the low-pressure column (namely, the column bottom of the second column) is supplied to the column top of the first column except for the amount of a part of the discharged liquid that is optionally returned to the column bottom of the low-pressure column (after being reboiled).

A part of a liquid discharged from the column bottom of the first column is heated in reboiler B9, at least partially vaporized, and returned to the first column. The rest of the liquid discharged from the column bottom of the first column is discharged from the distillation column as a liquid bottom product.

For each of the configuration around overhead condenser B12 and the configuration around reboiler B9, a configuration applied to a conventionally-known distillation column can be employed. For example, a gas-liquid separation drum (not shown) may be provided downstream of the overhead condenser, as necessary.

The fluid present within the rectifying section of the high-pressure column is cooled and the fluid present within the stripping section of the low-pressure column is heated by heat exchange structure B8. In other words, this heat exchange structure functions as a side cooler provided in the rectifying section of the distillation column shown in FIG. 2, and also functions as a side reboiler provided in the stripping section. According to the above-described configuration, heat can be transferred from the rectifying section included in the second column to the stripping section included in the second column.

Heat duties on overhead condenser B12 and reboiler B9 of the distillation column shown in FIG. 2 are reduced by the heat exchange structure as described above. On the other hand, required power of the compressor is additionally necessary as a load. However, if the required power can be kept sufficiently small, the energy consumption in the distillation column can be reduced.

The distillation column of Embodiment B can be preferably used in place of a conventional distillation column in which almost all column temperature change occurs in a region near the column bottom. This is because, by applying the HIDiC only to a region having a small column temperature change in the conventional distillation column, effective heat utilization can be achieved while the required power of the compressor is kept small.

Embodiment C (VRC)

Figure 3:
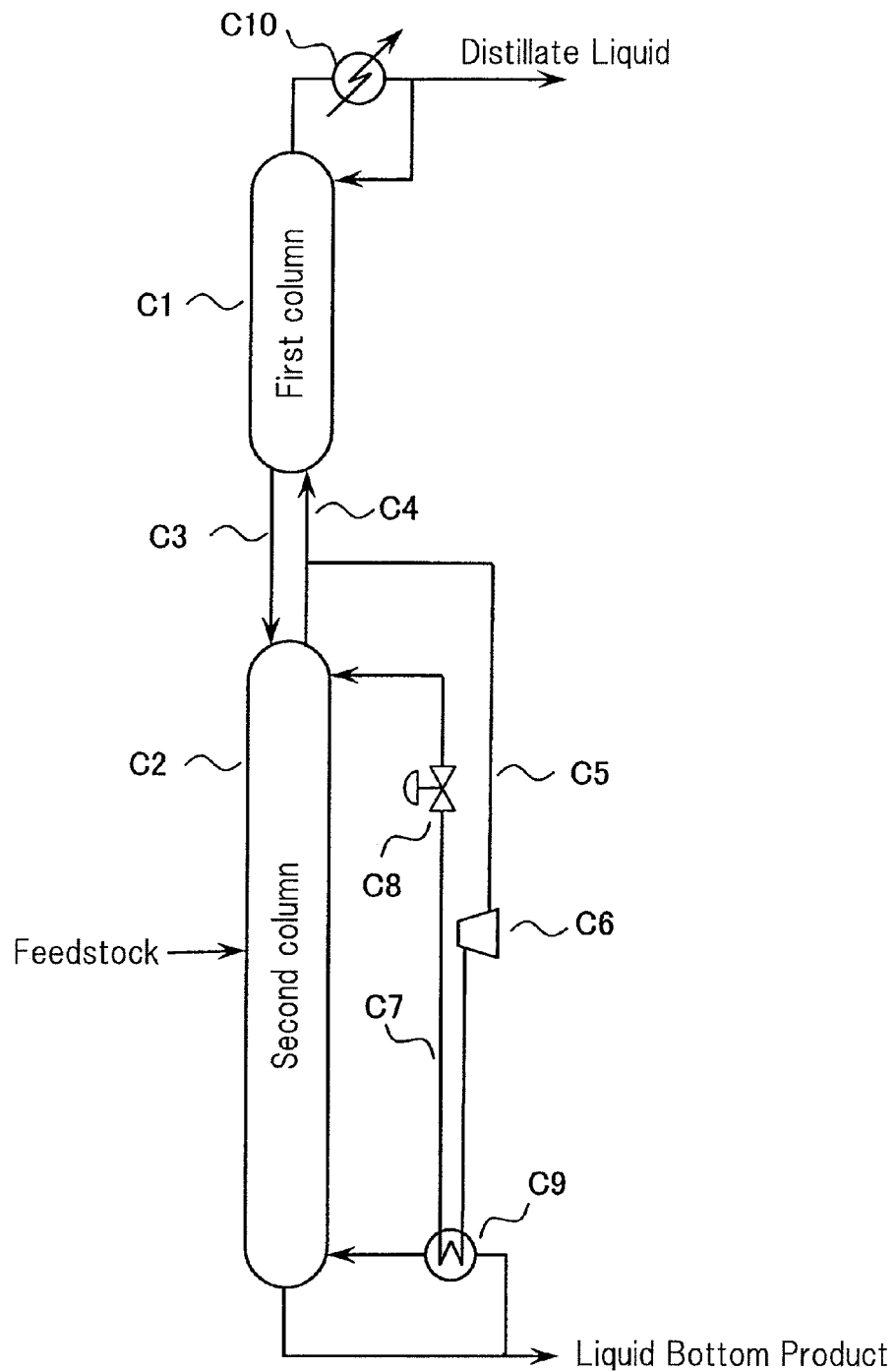
FIG. 3 is a schematic view illustrating a further embodiment of the distillation column of the present invention.

FIG. 3 schematically shows the configuration of yet another embodiment (Embodiment C) of the distillation column of the present invention. This distillation column includes first column C1 and second column C2. The second column constitutes the VRC. A feedstock is supplied to an intermediate stage of the second column. Therefore, a part of the rectifying section of the distillation column shown in FIG. 3 is included in the first column, and the rest is included in the second column. Also, the whole of the stripping section of the distillation column shown in FIG. 3 is included in the second column.

The second column is equipped with reboiler C9. A part of a vapor discharged from the column top of the second column is supplied to the reboiler as a heating source thereof via line C5. That is, line C5 is connected to a heating source inlet of the reboiler. Compressor C6 is provided as a pressurizing means in line C5. The vapor is pressurized and increased in temperature by the compressor, and supplied to the reboiler.

The fluid that has been used for heating a liquid discharged from the column bottom of the second column in the reboiler is returned to the column top of the second column via line C7. Pressure reducing valve C8 is provided in line C7, and decreases the pressure and the temperature of the fluid that flows through line C7. The fluid to be returned to the second column from line C7 is at least partially condensed. Therefore, reboiler C9 can function as an overhead condenser of the second column.

The rest of the vapor discharged from the column top of the second column is transferred to the column bottom of the first column via line C4 that branches from line C5. The whole amount of the vapor discharged from the column top of the second column is supplied to the first column except for the amount of the part of the discharged vapor that is returned to the second column via lines C5 and C7.

A liquid discharged from the column bottom of the first column is transferred to the column top of the second column via line C3. The operating pressure of the first column is equal to or lower than the operating pressure of the second column. The vapor discharged from the column top of the second column may be depressurized by a pressure reducing means, such as a pressure reducing valve, as necessary, and then supplied to the column bottom of the first column. With regard to the liquid discharged from the column bottom of the first column, a pump for transferring the liquid may be used, as necessary, in such a case where the liquid cannot be transferred to the second column from the first column due to a pressure loss in the piping or an elevation difference or the difference in operating pressure between the first column and the second column.

A reboiler may not be provided (FIG. 3), or may be provided in the first column. In any case, the whole amount of the liquid discharged from the column bottom of the first column is supplied to the column top of the second column except for the amount of a part of the discharged liquid that is optionally returned to the first column (after being reboiled).

A part of the liquid discharged from the column bottom of the second column is heated in reboiler C9, at least partially vaporized, and returned to the column bottom of the second column. The rest of the liquid discharged from the column bottom of the second column is discharged from the distillation column as a liquid bottom product.

A vapor discharged from the column top of the first column is cooled in overhead condenser C10, and at least partially condensed. A part of the condensed liquid is refluxed to the column top of the first column, and the rest of the condensed liquid (which may be accompanied by a vapor not condensed) is discharged from the distillation column as a distillate liquid.

For the configuration around overhead condenser C10, a configuration applied to a conventionally-known distillation column can be employed. For example, a reflux drum (not shown) may be provided downstream of the overhead condenser, as necessary.

Reboiler C9 functions as a reboiler of the distillation column shown in FIG. 3, and also functions as a side cooler of the distillation column shown in FIG. 3. Required power of the compressor is additionally necessary as a load. However, if the required power can be kept sufficiently small, the energy consumption in the distillation column can be reduced.

The distillation column of Embodiment C can be preferably used in place of a conventional distillation column in which almost all column temperature change occurs in a region near the column top. This is because, by applying the VRC only to a region having a small column temperature change within the conventional distillation column, effective heat utilization can be achieved while the required power of the compressor is kept small.

Embodiment D (VRC)

Figure 4:
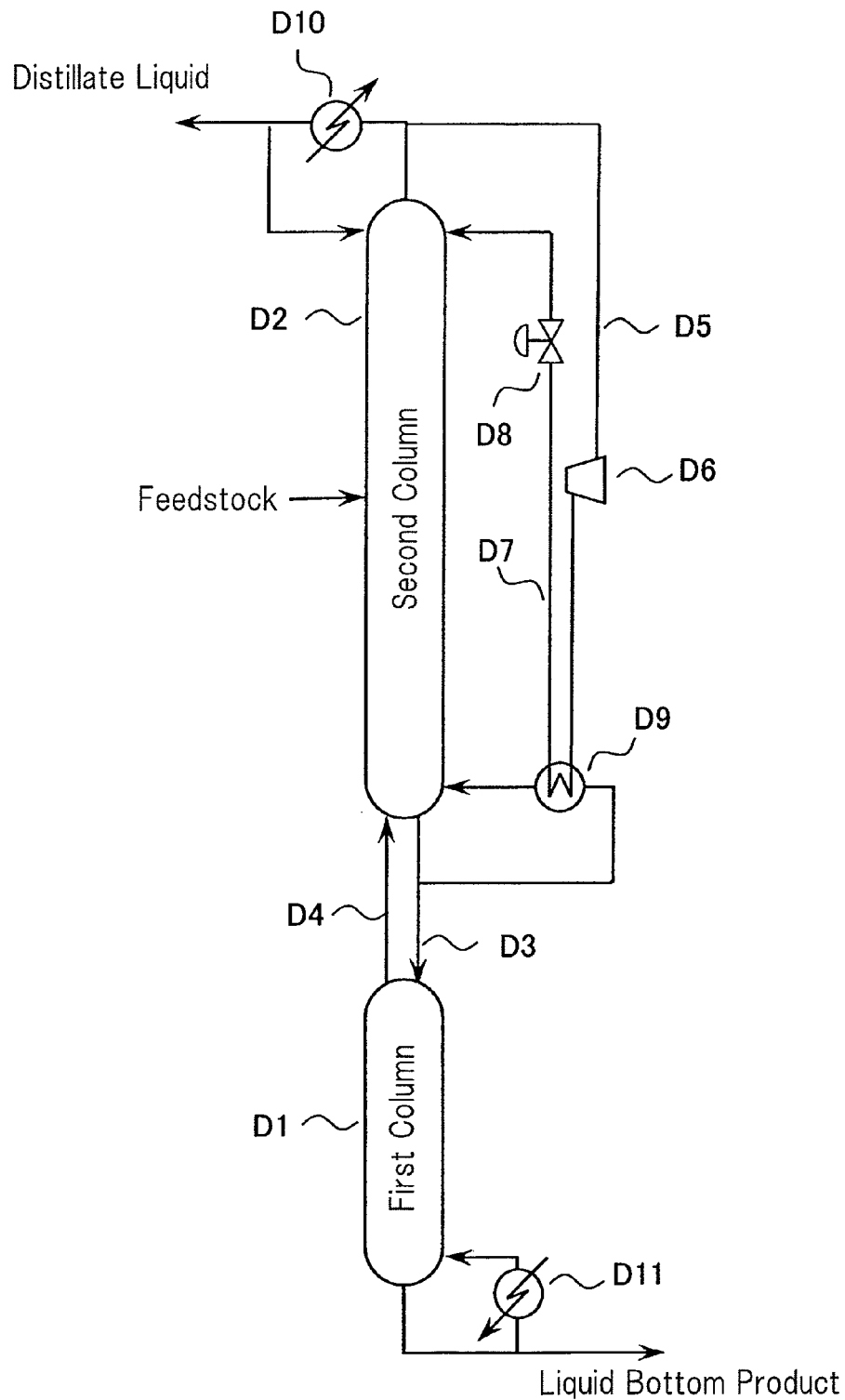
FIG. 4 is a schematic view illustrating a still further embodiment of the distillation column of the present invention.

FIG. 4 schematically shows the configuration of yet another embodiment (Embodiment D) of the distillation column of the present invention. This distillation column includes first column D1 and second column D2. The second column constitutes the VRC. A feedstock is supplied to an intermediate stage of the second column. Therefore, the whole of the rectifying section of the distillation column shown in FIG. 4 is included in the second column. Also, a part of the stripping section of the distillation column shown in FIG. 4 is included in the second column, and the rest is included in the first column.

The second column is equipped with reboiler D9. A part of a vapor discharged from the column top of the second column is supplied to reboiler D9 as a heating source thereof via line D5. That is, line D5 is connected to a heating source inlet of the reboiler. Compressor D6 is provided as a pressurizing means in line D5. The vapor is pressurized and increased in temperature by the compressor, and supplied to the reboiler.

The fluid that has been used for heating a liquid discharged from the column bottom of the second column in reboiler D9 is returned to the column top of the second column via line D7. Pressure reducing valve D8 is provided in line D7, and decreases the pressure and the temperature of the fluid flowing through line D7. The fluid to be returned to the second column from line D7 is at least partially condensed. Therefore, reboiler D9 can function as an overhead condenser of the second column.

The rest of the vapor discharged from the column top of the second column is cooled in overhead condenser D10, and at least partially condensed. A part of the condensed liquid is refluxed to the column top of the second column, and the rest of the condensed liquid (which may be accompanied by a vapor not condensed) is discharged from the distillation column as a distillate liquid.

A part of the liquid discharged from the column bottom of the second column is heated in reboiler D9, at least partially vaporized, and returned to the column bottom of the second column. The rest of the liquid discharged from the column bottom of the second column is transferred to the column top of the first column via line D3. The whole amount of the liquid discharged from the column bottom of the second column is supplied to the column top of the first column except for the amount of the part of the discharged liquid that is returned to the second column after being reboiled in reboiler D9.

A vapor discharged from the column top of the first column is transferred to the column bottom of the second column via line D4.

The operating pressure of the first column is set to be slightly higher than that of the second column. This pressure difference allows the vapor discharged from the column top of the first column to be supplied to the column bottom of the second column against a pressure loss in the piping or the like. With regard to the liquid discharged from the column bottom of the second column, a pump for transferring the liquid may be used, as necessary, in such a case where the liquid cannot be transferred to the first column from the second column due to a pressure loss in the piping or an elevation difference or the difference in operating pressure between the first column and the second column.

A condenser and a reflux line may not be provided (FIG. 4), or may be provided at the column top of the first column. In any case, the whole amount of the vapor discharged from the column top of the first column is supplied to the column bottom of the second column except for the amount of a part of the discharged vapor that is optionally returned to the first column (as a reflux).

A part of a liquid discharged from the column bottom of the first column is heated in reboiler D11, at least partially vaporized, and returned to the first column. The rest of the liquid discharged from the column bottom of the first column is discharged from the distillation column as a liquid bottom product.

For each of the configuration around overhead condenser D10 and the configuration around reboiler D11, a configuration applied to a conventionally-known distillation column can be employed. For example, a reflux drum (not shown) may be provided downstream of the overhead condenser, as necessary.

Reboiler D9 functions as a side reboiler of the distillation column shown in FIG. 4, and also functions as an overhead condenser of the distillation column shown in FIG. 4. Required power of the compressor is additionally necessary as a load. However, if the required power can be kept sufficiently small, the energy consumption in the distillation column can be reduced.

The distillation column of Embodiment D can be preferably used in place of a conventional distillation column in which almost all column temperature change occurs in a region near the column bottom. This is because, by applying the VRC only to a region having a small column temperature change in the conventional distillation column, effective heat utilization can be achieved while the required power of the compressor is kept small.

[Temperature Profile of the Distillation Column]

Figure 5:
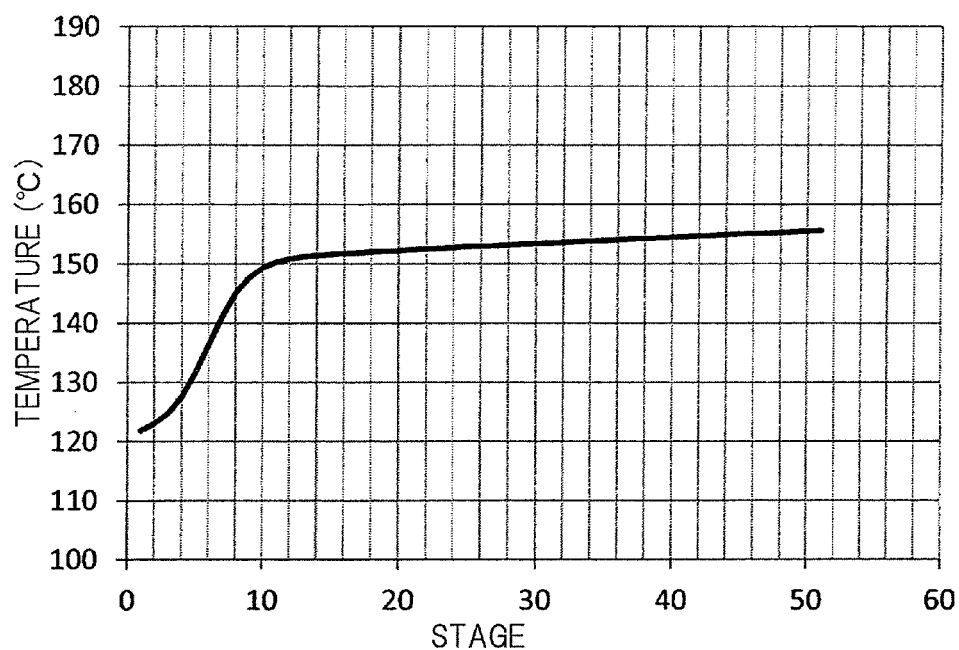
FIG. 5 is a view illustrating an example of a temperature profile of a distillation column.

FIG. 5 shows an example of a temperature profile of a distillation column. This graph shows a temperature profile of a distillation column used in Comparative Example 1 described in detail later (however, conditions are slightly different from those of Comparative Example 1). This distillation column is a conventional distillation column composed of a single column. The horizontal axis indicates the number of stages (counted from the column top) of the distillation column, and the vertical axis indicates the column temperature.

The total number of stages of the distillation column is 51, the column top temperature is about 120° C., and the column bottom temperature is about 155° C. With regard to this distillation column, the gradient of the illustrated curve is large, that is, the column temperature change is large, in a region near the column top. In the tenth stage, there is the largest change in the gradient of the curve.

The position at which a conventional column is divided into the first column and the second column according to the present invention is preferably a position where the change of the gradient of the curve that illustrates the column temperature profile is the largest, or the vicinity thereof. That is, as for the conventional distillation column having the temperature profile as shown in FIG. 5, the column is preferably divided at, for example, the tenth stage. In other words, when the temperature profile of a distillation column of aforementioned Embodiment A or C is illustrated by the curve shown in FIG. 5, the first and second columns are preferably configured, for example, so that the first column corresponds to a portion from the column top to the tenth stage of the conventional distillation column, and so that the second column corresponds the rest of the conventional distillation column.

In some cases, there may be a large column temperature change not in the region near the column top, but in a region near the column bottom. In such a case, aforementioned Embodiment B or D is preferably employed.

The temperature profile may vary depending on the specific configuration or the operating conditions of the distillation column. However, the aforementioned position for dividing a conventional column may be generally determined such that the number of stages of the first column is roughly 40% or less of the total number of stages of the conventional distillation column in either of the case where there is a large temperature change in the region near the column top, and the case where there is a large temperature change in the region near the column bottom. Therefore, the number of stages of the first column may be set to be 40% or less of the total number of stages of the distillation column of the present invention (the total of the number of stages of the first column and the number of stages of the second column).

[Detailed Heat Exchange Structure Used for the HIDiC]

In the following, examples of the heat exchange structure used for the HIDiC are described in detail.

First Detailed Example

The heat exchange structure as described in the above-described a), that is, the heat exchange structure configured to withdraw a liquid from the stripping section included in the second column, pass the liquid through a heat exchanger, and return the resulting fluid to the same stripping section may include, for example, the following elements:

a heat exchanger located at a certain stage of the rectifying section (referred to as "rectifying section X") included in the second column;

a liquid withdrawal unit located at a certain stage of the stripping section (referred to as "stripping section Y") included in the second column and configured to withdraw a part of liquid from this stage to the outside of the column;

a pipe (a first pipe) for introducing the liquid from the liquid withdrawal unit to this heat exchanger; and a pipe (a second pipe) for introducing, to a stage directly below the liquid withdrawal unit of stripping section Y, a fluid introduced through the first pipe to this heat exchanger and then discharged from this heat exchanger.

These elements will be described with reference to FIGS. 9 and 10.

Figure 9:
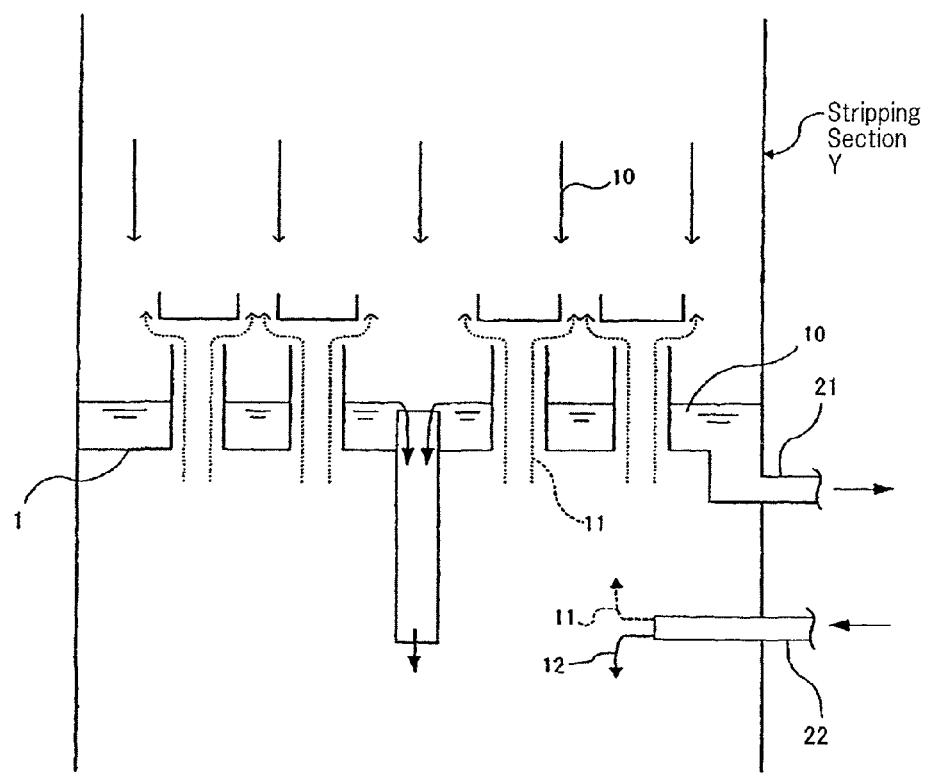
FIG. 9 is a view for explaining a detailed example of a heat exchange structure.

As shown in FIG. 9, the liquid withdrawal unit provided in stripping section Y holds liquid 10, which has descended from an upper part of stripping section Y, on chimney tray for sump 1, and withdraws a part of liquid 10 to the outside of the column. Pipe 21 (the first pipe) for directing the part of liquid 10 to the heat exchanger provided in rectifying section X is connected to the liquid withdrawal unit. Pipe 22 (the second pipe) from this heat exchanger is inserted through a shell wall of stripping section Y into a stage directly below the liquid withdrawal unit. From pipe 22 inserted into the stage directly below the liquid withdrawal unit (a stage directly below the chimney tray for sump), a fluid which is a mixture of vapor 11 and liquid 12 as described below is fed, and vapor 11 ascends while liquid 12 descends. The liquid withdrawal unit includes chimney tray for sump 1, and a connection port, which is provided on the shell wall of stripping section Y, to be connected with the first pipe.

Figure 10:
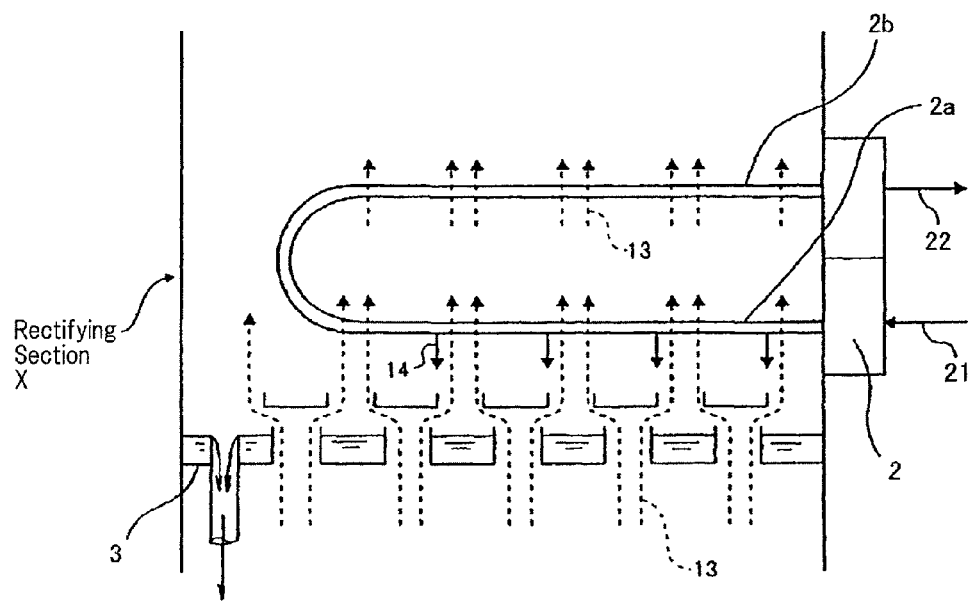
FIG. 10 is a view for explaining the detailed example of the heat exchange structure.

As shown in FIG. 10, tube-bundle-type heat exchanger 2 is inserted into a certain stage of rectifying section X. The parallel tube portions in the U-shaped tube of tube-bundle-type heat exchanger 2 are placed along chimney tray for sump 3 for temporarily holding a condensed liquid and for re-distributing vapor ascending from below. Lower tube portion 2a of the parallel tube portions is connected to pipe 21 (the first pipe) that is connected to the liquid withdrawal unit of stripping section Y. Upper tube portion 2b is connected to pipe 22 (the second pipe) that is inserted into the stage directly below the liquid withdrawal unit.

An operation of tube-bundle-type heat exchanger 2 will now be described. Vapor 13 (refer to FIG. 10) ascending inside rectifying section X comes into contact with the U-shaped tube of tube-bundle-type heat exchanger 2. A liquid at the certain stage of stripping section Y is introduced through pipe 21 to lower tube portion 2a of heat exchanger 2. Thus, the liquid within tube portion 2a is heated by the heat of vapor 13, and a part of vapor 13 in contact with tube portion 2a becomes liquid 14, and this liquid descends. Upper tube portion 2b of heat exchanger 2 is also heated by the heat of vapor 13. Thus, the liquid introduced through pipe 21 into heat exchanger 2 changes into a fluid which is a mixture of a liquid phase and a gas phase while the liquid moves through lower tube portion 2a and then through upper tube portion 2b. This fluid then passes through pipe 22 located outside the column to be introduced to the stage directly below the liquid withdrawal unit (chimney tray for sump 1) of stripping section Y (refer to FIG. 9).

When the liquid withdrawal unit of stripping section Y is located at a position vertically higher than the heat exchanger of rectifying section X, any pressure-feeding means such as a pump is not needed to circulate such fluids because the configuration described herein employs the thermo-siphon system.

A Second Detailed Example

The heat exchange structure as described in the above-described b), that is, the heat exchange structure configured to withdraw a vapor from the rectifying section included in the second column, pass the vapor through a heat exchanger, and return the resulting fluid to the same rectifying section may include, for example, the following elements:

a liquid sump unit located at a certain stage of the stripping section (referred to as "stripping section Y") included in the second column and configured to hold liquid that has flowed downward;

a heat exchanger located in the liquid sump unit;

a partition plate that is set in the rectifying section (referred to as "rectifying section X") included in the second column and that is configured for complete partition of upper and lower stages;

a pipe (a third pipe) for introducing vapor below the partition plate to this heat exchanger; and a pipe (a fourth pipe) for introducing, to an upper side of the partition plate, a fluid introduced through the third pipe to this heat exchanger and then discharged from this heat exchanger.

Figure 11:
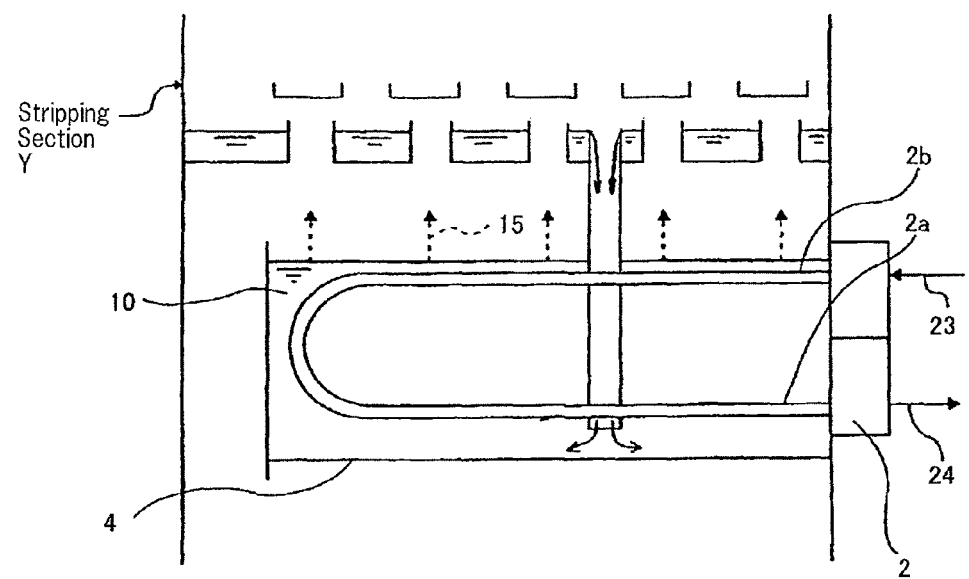
FIG. 11 is a view for explaining another detailed example of the heat exchange structure.

These elements will be described with reference to FIG. 11. The liquid sump unit provided at the certain stage of stripping section Y can store a predetermined amount of liquid 10 that has flowed down onto chimney tray for sump 4, and can drop liquid spilled from chimney tray for sump 4. Tube-bundle type heat exchanger 2 is inserted into the liquid sump unit, so that the U-shaped tube of tube-bundle-type heat exchanger 2 can be dipped in the liquid stored in the liquid sump unit. Parallel tube portions 2a and 2b in the U-shaped tube of tube-bundle-type heat exchanger 2 are placed along chimney tray for sump 4.

Pipe 23 for transferring a fluid from rectifying section X to stripping section Y is connected to upper tube portion 2b of the parallel tube portions. Pipe 24 for transferring a fluid from stripping section Y to rectifying section X is connected to lower tube portion 2a.

An operation of heat exchanger 2 in the liquid sump unit will now be described. Liquid descends from an upper part of stripping section Y through a tray or a packed layer. Liquid 10 stays at the liquid sump unit on chimney tray for sump 4 that is located at an arbitrary stage. The U-shaped tube of tube-bundle-type heat exchanger 2 is placed in the liquid sump unit, and hence the U-shaped tube is dipped in liquid 10. In this state, when high-temperature vapor present within rectifying section X is introduced through pipe 23 into upper tube portion 2b of heat exchanger 2, a part of liquid 10 in contact with the outer wall of tube portions 2b and 2a, through which the high-temperature vapor moves, is heated to become vapor 15 and ascends. Furthermore, the high-temperature vapor having been introduced from pipe 23 into heat exchanger 2 changes into a fluid which is a mixture of a liquid phase and a gas phase, or a liquid, while the vapor moves through upper tube portion 2b and then through lower tube portion 2a. This fluid then passes through the pipe located outside the column to be introduced to a stage above the partition plate of rectifying section X described later. A region above the partition plate in rectifying section X is set to have a lower operating pressure than a region below the partition plate, and the fluid is circulated by this pressure difference. When the heat exchanger of stripping section Y is located at a position vertically higher than the partition plate of rectifying section X, any pressure-feeding means such as a pump is not needed to circulate such fluids.

In other words, because the certain stage of rectifying section X is connected to upper tube portion 2b of heat exchanger 2 in stripping section Y via pipe 23 and because lower tube portion 2a of heat exchanger 2 in stripping section Y is connected to the above-mentioned stage of rectifying section X via pipe 24, high-pressure vapor present in rectifying section X ascends toward heat exchanger 2 in stripping section Y through pipe 23 owing to the pressure difference between the regions below and above the partition plate of rectifying section X. As a result, the liquid condensed from the vapor within heat exchanger 2 is then pushed out of stripping section Y to pipe 24 located outside the column, and then descends to rectifying section X by gravity. Thus, any pressure-feeding means such as a pump is not necessary.

Rectifying section X is completely partitioned into upper and lower stages by the partition plate at a position located partway. The stage directly below the partition plate communicates with pipe 23. Ascending vapor in this stage is transferred, through pipe 23, to upper tube portion 2b of heat exchanger 2 placed in the liquid sump unit of stripping section Y. Into the upper stage of the partition plate, pipe 24 from stripping section Y is inserted through the shell wall of rectifying section X. A fluid which is a mixture of vapor and liquid is introduced into the upper stage of the partition plate through pipe 24, and the vapor ascends while the liquid descends to stay on the partition plate within rectifying section X. Furthermore, the two stages vertically adjacent to each other with the partition plate sandwiched therebetween can communicate with each other through a pipe having a control valve. The liquid held on the partition plate is fed to the stage below the partition plate by an operation of opening the control valve when appropriate.

According to the present invention, significant energy saving can be achieved for a distillation column even when the distillation column has a large column temperature difference. In particular, significant energy saving can be achieved for a distillation column when, in the column temperature profile of the distillation column, a significant part of the temperature difference between the column top and the column bottom, e.g., about half of the temperature difference between the column top and the column bottom, occurs near the column top or near the column bottom. Also, further energy saving can be achieved when the temperature difference between the column top and the column bottom is small.

EXAMPLES

Figure 6:
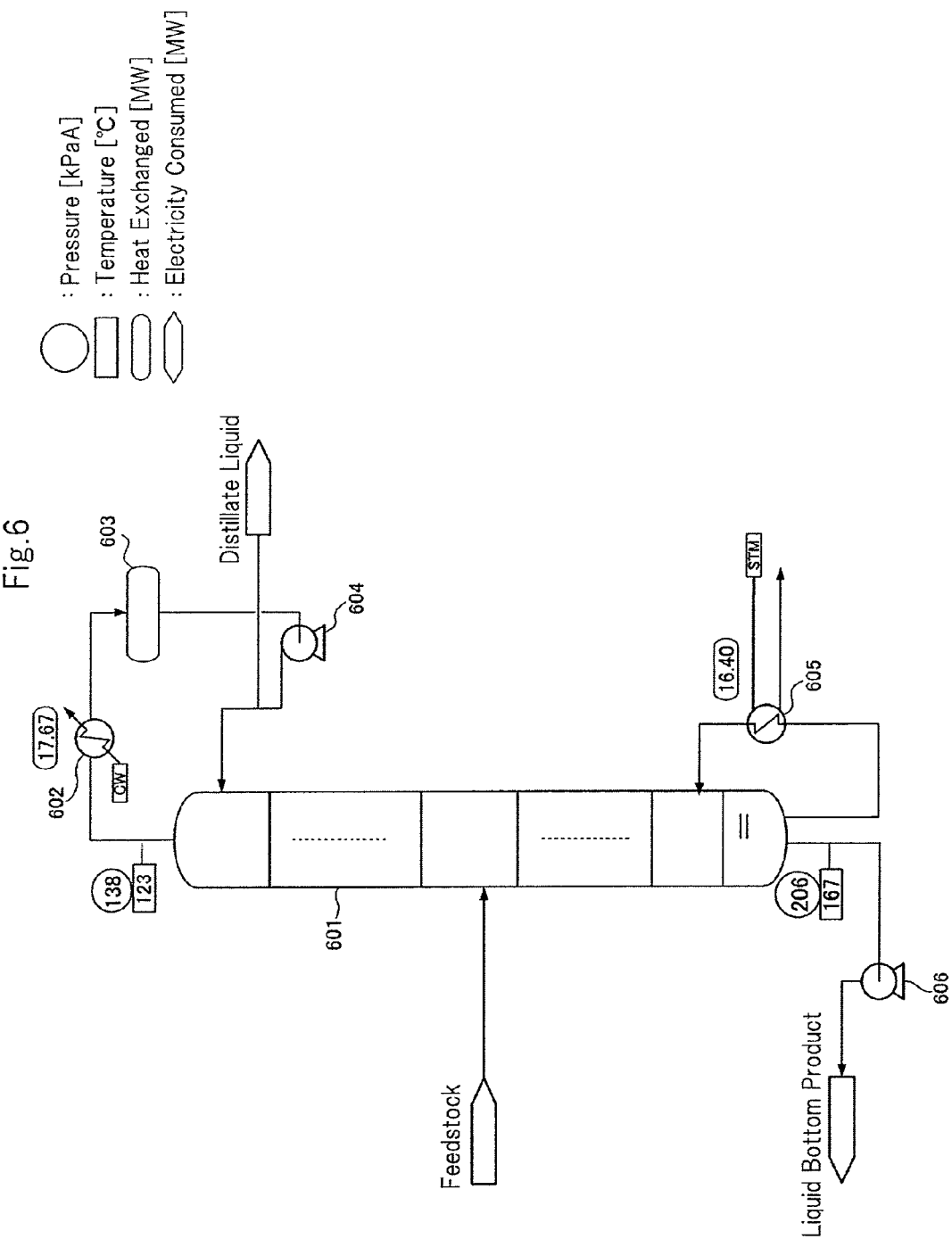
FIG. 6 is a process flow diagram illustrating a distillation column of Comparative Example 1.
Figure 7:
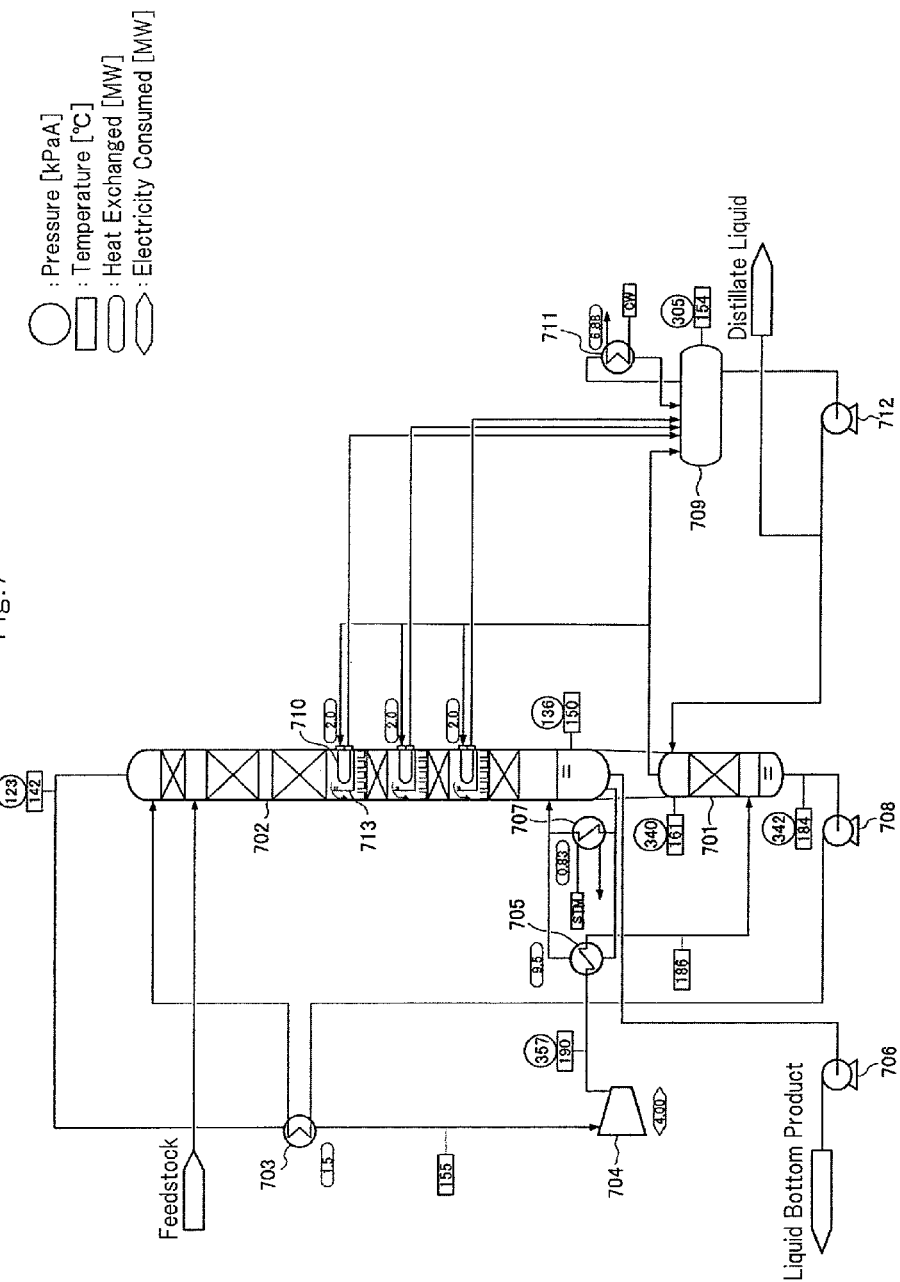
FIG. 7 is a process flow diagram illustrating a distillation column of Comparative Example 2.
Figure 8:
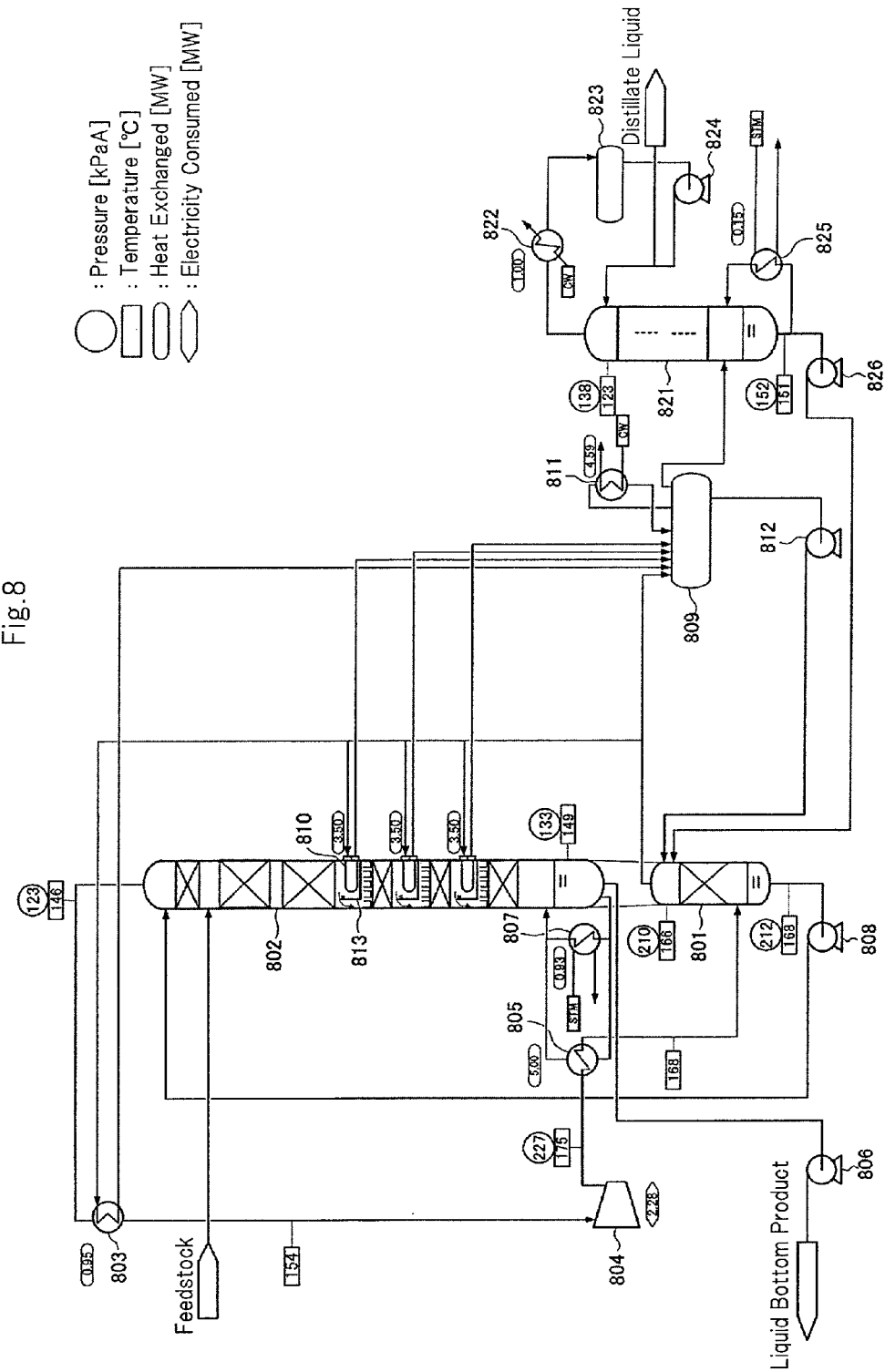
FIG. 8 is a process flow diagram illustrating a distillation column of Example 1.

In the following, the present invention will be described in more detail based on examples, but is not limited thereto. FIGS. 6 to 8 show some pressures (kPaA), temperatures (° C.), exchanged heats (MW), and electricity consumptions (MW). The pressures are shown in circles, the temperatures are shown in rectangles, the exchanged heats are shown in elongated circles, and the electricity consumptions are shown in elongated hexagons. The letter "A" in the pressure unit "kPaA" means that the pressure is an absolute pressure. In the drawings, CW and STM respectively denote cooling water and steam.

Comparative Example 1

Heat and material balance was calculated for a para-xylene purification column for purifying para-xylene by separating toluene from a feedstock in which toluene was mixed into para-xylene by distillation. In the present example, a conventional distillation column was used. The material balance (the flow rates and the compositions of a feedstock, a distillate liquid, and a liquid bottom product) is shown in Table 1.

For the process for performing this separation by a conventional distillation operation, the flow diagram is as shown in FIG. 6.

As shown in FIG. 6, a feedstock is supplied to distillation column 601. The total number of stages of the distillation column is 51 including a condenser stage and a reboiler stage. The feedstock is supplied to an optimum stage in order that the reboiler duty becomes smallest.

A vapor having a pressure of 138 kPaA and a temperature of 123° C. is discharged from the column top, cooled and fully condensed by cooling water in overhead condenser 602, and supplied to pump 604 via drum 603. A part of the outlet liquid of pump 604 is refluxed to the column top of the distillation column, and the rest is discharged from the distillation column as a distillate liquid.

A liquid having a pressure of 206 kPaA and a temperature of 167° C. is discharged from the column bottom. A part of the liquid is heated by steam in reboiler 605, partially vaporized, and returned to the column bottom of the distillation column. The rest of the liquid discharged from the column bottom is pressurized in pump 606, and discharged from the distillation column as a liquid bottom product.

Table 2 shows the column top operating pressure, the utility cooling duty, the utility heating duty, and the electricity consumption of this distillation column, and also shows the total utility cooling duty, the total utility heating duty, and the total electricity consumption. Here, the utility cooling duty means a cooling duty by utilities, and more specifically, the amount of heat removed from the distillation column by cooling water in overhead condenser 602. The utility heating duty means a heating duty by utilities, and more specifically, the amount of heat applied to the distillation column by steam in reboiler 605.

Each of the pumps for pumping liquid has only to increase the pressure by an amount corresponding to a pressure loss in piping and/or a lifting height for transferring liquid from a lower position to a higher position. Therefore, electricity consumption of the pumps is sufficiently smaller than that of the compressors for compressing gas. Therefore, the electricity consumption of the pumps is disregarded in the Example and the Comparative Examples. Since no compressor is used in the present example, the electricity consumption is zero.

Comparative Example 2

Heat and material balance was calculated for a paraxylene purification column in the same manner as Comparative Example 1. However, the HIDiC was used in the present example instead of the conventional distillation column. The material balance is the same as that of Comparative Example 1, and is shown in Table 1.

This distillation column includes high-pressure column 701 and low-pressure column 702. High-pressure column 701 is installed vertically below low-pressure column 702.

A feedstock is supplied to an intermediate stage of low-pressure column 702 (a stage close to the column top of the low-pressure column). In low-pressure column 702, a section below the feedstock feed position is the stripping section, and a section above the feedstock feed position is a part of the rectifying section of the distillation column of the present example. The rest of the rectifying section of the distillation column of the present example is included in high-pressure column 701.

A vapor (123 kPaA, 142° C.) is withdrawn from the column top of low-pressure column 702, and heated to 155° C. in heat exchanger 703 so as not to be condensed in a compression process by a compressor. The heated vapor is pressurized and simultaneously increased in temperature (357 kPaA, 190° C.) by compressor 704, cooled to 186° C. by heat exchanger 705, and supplied to the column bottom (342 kPaA, 184° C.) of high-pressure column 701. A part of a liquid withdrawn from the column bottom (136 kPaA, 150° C.) of low-pressure column 702 is discharged from the distillation column as a liquid bottom product via pump 706, and the rest is divided into two streams. One of the divided streams is heated by steam in reboiler 707, and returned to the column bottom of low-pressure column 702. The other of the divided streams is heated in heat exchanger 705, and returned to the column bottom of low-pressure column 702. The operating temperature of the high-pressure column is made higher than the operating temperature of the low-pressure column by compression in compressor 704. Heat exchanger 705 functions as a reboiler, and also functions as a side cooler of the distillation column of the present example. In this heat exchanger, internal heat exchange of the HIDiC is effected. That is, a heating duty on reboiler 707 is reduced by the heat exchange in heat exchanger 705, and thus energy saving is achieved.

A liquid withdrawn from the column bottom of high-pressure column 701 is pressurized in pump 708, cooled in heat exchanger 703, and supplied to the column top of low-pressure column 702. Pump 708 is provided for transferring liquid from a lower position to a higher position, as necessary.

A part of a vapor withdrawn from the column top (340 kPaA, 161° C.) of the high-pressure column is transferred to reflux drum 709. The rest of the vapor withdrawn from the column top of the high-pressure column is divided into three streams, which are respectively cooled in three heat exchangers 710 provided in low-pressure column 702, and transferred to drum 709.

Heat exchanger (overhead condenser) 711 is connected to reflux drum 709. In heat exchanger 711, cooling water is used as a cooling medium. The vapor from drum 709 flows into heat exchanger 711, is cooled and condensed, and returned to drum 709. The liquid from this drum is pressurized in pump 712. A part of the outlet liquid of pump 712 is returned to the column top of high-pressure column 701 as a reflux. The rest of the outlet liquid of pump 712 is discharged from the distillation column as a distillate liquid.

Liquid sump units 713 and also tube-bundle-type heat exchangers 710, as described in detail in the second detailed example of the heat exchange structure, are provided at three stages of low-pressure column 702 (particularly, the stripping section thereof). Each of tube-bundle-type heat exchangers 710 is provided so as to be dipped in the liquid stored in the liquid sump unit. It should be noted that the partition plate, and the third and fourth pipes described in the second detailed example are not employed here.

As described above, a part of the vapor withdrawn from the column top of high-pressure column 701 is divided into three streams, which are transferred to drum 709 after respectively passing through heat exchangers 710. Lines for directing the vapor from the column top of high-pressure column 701 to heat exchangers 710, heat exchangers 710, liquid sump units 713, and lines for returning the fluid discharged from heat exchangers 710 to the column top of high-pressure column 701 via drum 709 and pump 712 constitute the heat exchange structure of the HIDiC. The heat of the rectifying section of the distillation column of the present example is transferred to the stripping section of the distillation column of the present example by this heat exchange structure. Heat exchangers 710 function as overhead condensers of the distillation column of the present example, and also function as side reboilers of the distillation column of the present example. Accordingly, internal heat exchange of the HIDiC is effected, and thus energy saving is achieved.

Table 2 shows the column top operating pressure, the utility cooling duty, the utility heating duty, and the electricity consumption of the distillation column of the present example, and also shows the total utility cooling duty, the total utility heating duty, and the total electricity consumption. Here, the utility cooling duty means a cooling duty by utilities, and more specifically, the amount of heat removed from the distillation column by cooling water in overhead condenser 711. Here, the utility heating duty means a heating duty by utilities, and more specifically, the amount of heat applied to the distillation column by steam in reboiler 707. Although three heat exchangers 710 also function as the overhead condensers, it is not required to remove heat to the outside since the cooling is performed using a fluid present within the distillation column in each of these heat exchangers, and therefore, their utility cooling duties are zero. Heat exchanger 705 also functions as the reboiler. However, since a fluid present within the distillation column is used as the heating source in this heat exchanger, it is not required to heat the reboiler from the outside, and therefore, its utility heating duty is zero. The electricity consumption is electricity consumed in compressor 704. As the electricity consumption, a value including a mechanical loss is shown.

Since the mechanical loss is assumed to be 7%, the electricity consumption is a value obtained by multiplying electricity required for compression by 1.07 (the same applies to other examples).

An energy saving index ESI is an index indicating how much the total value of the total utility heating duty and the total electricity consumption (a value obtained by converting consumed electricity to primary energy; the value converted to primary energy=electricity/0.366) has been reduced with respect to that of the example in which the conventional distillation column is used (Comparative Example 1).

Example 1

Heat and material balance was calculated for a paraxylene purification column in the same manner as Comparative Example 1. However, a distillation column including a first column and a second column according to the present invention was used in the present example instead of the conventional distillation column. The second column constitutes the HIDiC. The distillation column of the present example has a configuration in which the total number of stages (the total of the number of stages of the first column and the number of stages of the second column) is equal to that of the conventional distillation column (the total number of stages of 51) of Comparative Example 1. The number of stages of the first column is set such that the temperature change in the first column accounts for about 65% of the temperature difference from the column top to the column bottom in the conventional distillation column, and the number of stages of the first column is ⅓ or less of the total number of stages. The material balance is the same as that of Comparative Example 1, and is shown in Table 1.

The distillation column of the present example includes first column 821 and the second column. The second column includes high-pressure column 801 and low-pressure column 802. High-pressure column 801 is installed vertically below low-pressure column 802. First column 821 is composed of a single column, and does not have a pressurizing means, such as a compressor, for pressurizing and increasing the temperature of a vapor discharged from the column.

A feedstock is supplied to an intermediate stage of low-pressure column 802 (a stage close to the column top of the low-pressure column). In low-pressure column 802, a section below the feedstock feed position is the stripping section of the distillation column of the present example. The rectifying section of the distillation column of the present example is included in a section above the feedstock feed position of low-pressure column 802, high-pressure column 801, and first column 821.

A vapor (123 kPaA, 146° C.) is withdrawn from the column top of low-pressure column 802, and heated to 154° C. in heat exchanger 803 so as not to be condensed in a compression process by a compressor. The heated vapor is pressurized and simultaneously increased in temperature (227 kPaA, 175° C.) by compressor 804, cooled to 168° C. by heat exchanger 805, and supplied to the column bottom (212 kPaA, 168° C.) of high-pressure column 801. A part of a liquid withdrawn from the column bottom (133 kPaA, 149° C.) of low-pressure column 802 is discharged from the distillation column as a liquid bottom product via pump 806, and the rest is divided into two streams. One of the divided streams is heated by steam in reboiler 807, and returned to the column bottom of low-pressure column 802. The other of the divided streams is heated in heat exchanger 805, and returned to the column bottom of low-pressure column 802. The operating temperature of the high-pressure column is made higher than the operating temperature of the low-pressure column by compression in compressor 804. Heat exchanger 805 functions as a reboiler, and also functions as a side cooler of the distillation column of the present example. In this heat exchanger, internal heat exchange of the HIDiC is effected. That is, a heating duty on reboiler 807 is reduced by the heat exchange in heat exchanger 805, and thus energy saving is achieved.

A liquid withdrawn from the column bottom of high-pressure column 801 is pressurized in pump 808, and supplied to the column top of low-pressure column 802. Pump 808 is provided for transferring liquid from a lower position to a higher position, as necessary.

A part of a vapor withdrawn from the column top (210 kPaA, 166° C.) of the high-pressure column is transferred to reflux drum 809. The rest of the vapor withdrawn from the column top of the high-pressure column is divided into four streams. Three of the four streams are respectively cooled in three heat exchangers 810 provided in low-pressure column 802, and transferred to drum 809. The remaining one of the four streams is cooled in heat exchanger 803, and transferred to drum 809.

Heat exchanger (condenser of the second column) 811 is connected to reflux drum 809. In heat exchanger 811, cooling water is used as a cooling medium. A vapor from drum 809 flows into heat exchanger 811, is cooled and condensed, and returned to drum 809. The liquid from this drum is pressurized in pump 812, and returned to the column top of high-pressure column 801 as a reflux.

Liquid sump units 813 and also tube-bundle-type heat exchangers 810, as described in detail in the second detailed example of the heat exchange structure, are provided at three stages of low-pressure column 802 (particularly, the stripping section thereof). Each of tube-bundle-type heat exchangers 810 is provided so as to be dipped in the liquid stored in the liquid sump unit. It should be noted that the partition plate, and the third and fourth pipes described in the second detailed example are not employed here.

As described above, a part of the vapor withdrawn from the column top of high-pressure column 801 is divided into four streams, three of which are transferred to drum 809 after respectively passing through heat exchangers 810. Lines for directing the vapor from the column top of high-pressure column 801 to heat exchangers 810, heat exchangers 810, liquid sump units 813, and lines for returning the fluid discharged from heat exchangers 810 to the column top of high-pressure column 801 via drum 809 and pump 812 constitute the heat exchange structure of the HIDiC. The heat of the rectifying section of the distillation column of the present example is transferred to the stripping section of the distillation column of the present example by this heat exchange structure. Heat exchangers 810 function as side coolers of the distillation column of the present example, and also function as side reboilers of the distillation column of the present example. Accordingly, internal heat exchange of the HIDiC is effected, and thus energy saving is achieved.

The HIDiC is formed by the above-described configuration. That is, the above description relates to the HIDiC part of the distillation column of the present example.

A vapor from drum 809 is supplied to the column bottom (152 kPaA, 151° C.) of first column 821.

A vapor discharged from the column top (138 kPaA, 123° C.) of the first column is cooled and fully condensed in overhead condenser 822, passes through drum 823, and pressurized in pump 824. A part of the pressurized liquid is returned to the column top of the first column, and the rest is discharged from the distillation column of the present example as a distillate liquid.

A part of a liquid discharged from the column bottom of the first column is heated by steam in reboiler 825, and returned to the column bottom of the first column. The rest of the liquid discharged from the column bottom of the first column is transferred to the column top of high-pressure column 801 of the second column via pump 826.

Table 2 shows the column top operating pressure, the utility cooling duty, the utility heating duty, and the electricity consumption of the first column. Here, the utility cooling duty means a cooling duty by utilities, and more specifically, the amount of heat removed from the distillation column by cooling water in overhead condenser 822. Here, the utility heating duty means a heating duty by utilities, and more specifically, the amount of heat applied to the distillation column by steam in reboiler 825. Since no compressor is provided in the first column, the electricity consumption is zero.

Also, Table 2 shows the column top operating pressure, the utility cooling duty, the utility heating duty, and the electricity consumption of the second column. Here, the utility cooling duty specifically means the amount of heat removed from the distillation column by cooling water in heat exchanger 811. Here, the utility heating duty specifically means the amount of heat applied to the distillation column by steam in reboiler 807. Although three heat exchangers 810 also function as the condensers of the second column, it is not required to remove heat to the outside since the cooling is performed using a fluid present within the distillation column in each of these heat exchangers, and therefore, their utility cooling duties are zero. Heat exchanger 805 also functions as the reboiler. However, since a fluid present within the distillation column is used as the heating source, it is not required to heat the reboiler from the outside, and therefore, its utility heating duty is zero. The electricity consumption is electricity consumed in compressor 804.

In the present example, gas-liquid separation drum 809, heat exchanger (condenser of the second column) 811, and pump 812 are used. That is, the distillation column of the present example is provided with the condenser for condensing a part of the vapor discharged from the column top of the second column (particularly, the high-pressure column thereof). This condenser is cooled by a cooling medium other than the process fluid, e.g., cooling water. Further, the distillation column of the present example is provided with the gas-liquid separation drum for performing gas-liquid separation of the fluid (the fluid obtained by cooling the vapor discharged from the column top of the second column) discharged from the condenser, and the pump for returning the liquid discharged from the gas-liquid separation drum to the column top of the second column. In other words, the second column is provided with the reflux line including the overhead condenser. Consequently, flexibility and stability in operating the distillation column that includes the first and second columns are improved.

As is understood from Table 2, in Example 1, the energy can be significantly reduced by about 55% as compared with Comparative Example 1. In Comparative Example 2, the energy saving is only about 28%. This advantage of Example 1 is due to performing a required distillation operation using two divided regions, one of which has a relatively large column temperature difference and the other has a relatively small temperature difference, and not applying a mechanical-heat-pump distillation column to the former (using a conventional distillation column), but applying a mechanical-heat-pump distillation column only to the latter.

TABLE 1

|  | Feedstock | Distillate liquid | Liquid bottom product |
|---|---|---|---|
| Mass flow rate [kg/h] | 102135 | 482 | 101653 |
| Molar flow rate [kmol/h] | 962.7 | 5.2 | 957.5 |
| Molar fraction [—] | | | |
| Benzene | 0.0001 | 0.0163 | 0 |
| Toluene | 0.0051 | 0.9469 | 0.0000 |
| Ethylbenzene | 0.0019 | 0.0002 | 0.0019 |
| Para-xylene | 0.9918 | 0.0366 | 0.9970 |
| Meta-xylene | 0.0007 | 0.0000 | 0.0008 |
| Ortho-xylene | 0.0003 | 0.0000 | 0.0003 |

TABLE 2

| | | | Comparative Example 1 | Comparative Example 2 | Example 1 |
|---|---|---|---|---|---|
| First column | Column top pressure | kPaA | 138 | 340/123 | 138 |
| | Utility cooling duty | MW | 17.67 | 6.88 | 1.00 |
| | Utility heating duty | MW | 16.40 | 0.83 | 0.15 |
| | Electricity consumption (including mechanical loss) | kW | 0 | 3,998 | 0 |
| Second column | Column top pressure | kPaA | — | — | 210/123 |
| | Utility cooling duty | MW | — | — | 4.59 |
| | Utility heating duty | MW | — | — | 0.93 |
| | Electricity consumption (including mechanical loss) | kW | — | — | 2,283 |
| Total | Utility cooling duty | MW | 17.67 | 6.88 | 5.59 |
| | Utility heating duty | MW | 16.40 | 0.83 | 1.08 |
| | Electricity consumption (including mechanical loss) | kW | 0 | 3,998 | 2,283 |
| Energy saving index (ESI) | | % | 0 | 28.3 | 55.4 |

ESI [%] = {1 − ($Q_{RH}$ + $W_H$/0.366)/$Q_{RC}$} × 100

$Q_{RH}$: total utility heating duty [MW]

$W_H$: total electricity consumption [MW]

$Q_{RC}$: total utility heating duty in Comparative Example 1 [MW]

EXPLANATION OF LETTERS OR NUMERALS

A1, B1, C1, D1: first column
A2, B2, C2, D2: second column
A3, B3: high-pressure column
A4, B4: low-pressure column
A6, B6, C6, D6: compressor
A8, B8: heat exchange structure
A9, B9, C9, D9, D11: reboiler
A12, B12, C10, D10: condenser
C8, D8: pressure reducing valve
1, 4: chimney tray for sump
2: tube-bundle-type heat exchanger
2a: lower tube portion
2b: upper tube portion
3: chimney tray for sump
10, 12, 14: liquid
11, 13, 15: vapor
21, 22, 23, 24: pipe
601: conventional distillation column
602: condenser
603: drum
604, 606: pump
605: reboiler
701, 801: high-pressure column
702, 802: low-pressure column
703, 705, 803, 805: heat exchanger
704, 804: compressor
706, 708, 712, 806, 808, 812, 824, 826: pump
707, 807, 825: reboiler
709, 809, 823: drum
710, 810: heat exchanger (tube-bundle-type)
711, 811, 822: condenser
713, 813: liquid sump unit
821: first column

What is claimed is:

1. A distillation apparatus comprising a first device and a second device, wherein
the first device consists of a first column comprising a part of a rectifying section or a part of a stripping section,
the second device comprises, if the first column comprises a part of the rectifying section, the rest of the rectifying section and the whole of the stripping section, or the second device comprises, if the first column comprises a part of the stripping section, the rest of the stripping section and the whole of the rectifying section, and
the second device constitutes a mechanical-heat-pump distillation column,
the distillation apparatus does not include a compressor or any other structure for pressurizing a vapor discharged from an inside of the first column, and
a column temperature difference of the second device is smaller than a column temperature difference of the first column.

2. The distillation apparatus according to claim 1, wherein the number of stages of the first column is 40% or less of the total number of stages of the distillation apparatus.

3. The distillation apparatus according to claim 1, wherein the second device constitutes a heat integrated distillation column or a vapor re-compression system.

4. The distillation apparatus according to claim 3, wherein the second device comprises:
a higher-pressure part comprising the whole or a part of the rectifying section included in the second device and configured to perform gas-liquid contact at a relatively high pressure;
a lower-pressure part comprising the whole or a part of the stripping section included in the second device and configured to perform gas-liquid contact at a relatively low pressure;
a vapor line, comprising a pressurizing means, for directing a vapor discharged from a column top of the lower-pressure part to a column bottom of the higher-pressure part;
a liquid line for directing a liquid discharged from the column bottom of the higher-pressure part to the column top of the lower-pressure part; and
a heat exchange structure configured to transfer heat from the rectifying section included in the second device to the stripping section included in the second device by heat exchange.

5. The distillation apparatus according to claim 3, wherein the second device comprises:
a reboiler; and
a line, comprising a pressurizing means, for supplying a vapor discharged from a column top of the second device to the reboiler as a heat source.

6. The distillation apparatus according to claim 2, wherein the second device constitutes a heat integrated distillation column or a vapor re-compression system.

7. The distillation apparatus according to claim 6, wherein the second device comprises:
a higher-pressure part comprising the whole or a part of the rectifying section included in the second device and configured to perform gas-liquid contact at a relatively high pressure;
a lower-pressure part comprising the whole or a part of the stripping section included in the second device and configured to perform gas-liquid contact at a relatively low pressure;
a vapor line, comprising a pressurizing means, for directing a vapor discharged from a column top of the lower-pressure part to a column bottom of the higher-pressure part;
a liquid line for directing a liquid discharged from the column bottom of the higher-pressure part to the column top of the lower-pressure part; and
a heat exchange structure configured to transfer heat from the rectifying section included in the second device to the stripping section included in the second device by heat exchange.

8. The distillation apparatus to claim 6, wherein the second device comprises:
a reboiler; and
a line, comprising a pressurizing means, for supplying a vapor discharged from a column top of the second device to the reboiler as a heat source.

* * * * *